US009542006B2

(12) United States Patent
Soffer

(10) Patent No.: US 9,542,006 B2
(45) Date of Patent: Jan. 10, 2017

(54) SECURE KM SWITCH

(75) Inventor: Aviv Soffer, Caesarea (IL)

(73) Assignee: HIGH SEC LABS LTD., Yokneam Industrial Zone (IL)

( * ) Notice: Subject to any disclaimer, the term of this patent is extended or adjusted under 35 U.S.C. 154(b) by 208 days.

(21) Appl. No.: 13/979,975

(22) PCT Filed: Jan. 15, 2012

(86) PCT No.: PCT/IL2012/050012
§ 371 (c)(1),
(2), (4) Date: Oct. 4, 2013

(87) PCT Pub. No.: WO2012/095852
PCT Pub. Date: Jul. 19, 2012

(65) Prior Publication Data
US 2014/0019652 A1      Jan. 16, 2014

Related U.S. Application Data

(60) Provisional application No. 61/433,222, filed on Jan. 16, 2011.

(51) Int. Cl.
| G06F 13/12 | (2006.01) |
| G06F 3/02 | (2006.01) |
| G06F 21/83 | (2013.01) |
| G06F 21/84 | (2013.01) |
| G06F 3/023 | (2006.01) |
| G06F 1/16 | (2006.01) |
| G06F 13/38 | (2006.01) |

(52) U.S. Cl.
CPC .............. G06F 3/02 (2013.01); G06F 21/83 (2013.01); G06F 21/84 (2013.01); *G06F 1/1632* (2013.01); *G06F 3/023* (2013.01); *G06F 13/385* (2013.01)

(58) Field of Classification Search
None
See application file for complete search history.

(56) References Cited

U.S. PATENT DOCUMENTS

| 7,746,321 B2 * | 6/2010 | Banning ........................ 345/157 |
| 8,769,172 B2 * | 7/2014 | Soffer et al. .................... 710/64 |
| 2005/0044266 A1 * | 2/2005 | O'Neil .......................... 709/238 |

(Continued)

FOREIGN PATENT DOCUMENTS

WO      WO 03/009118 A2 *   1/2003

*Primary Examiner* — Henry Tsai
*Assistant Examiner* — Aurangzeb Hassan
(74) *Attorney, Agent, or Firm* — Browdy and Neimark, PLLC

(57) ABSTRACT

A system enabling a computer user to securely share a single set of keyboard and mouse (KM) among multiple isolated computers. The system enables one set of peripheral devices to independently interact with multiple coupled isolated computers through mouse position analysis on a virtual display area corresponding to multiple physical user displays of the particular installation. The system may be used to enable computer user having multiple isolated computers each with one or more coupled display to automatically switch a single set of keyboard mouse and other peripheral devices between the different computers. As isolated computers may have different security levels, the method and apparatus of the present invention prevents and potential data leakages between computers and coupled networks.

20 Claims, 16 Drawing Sheets

(56) References Cited

U.S. PATENT DOCUMENTS

2006/0230110 A1* 10/2006 VanHarlingen et al. ..... 709/205
2008/0048975 A1*  2/2008 Leibow ........................ 345/156
2012/0042099 A1*  2/2012 Wong et al. ...................... 710/9

* cited by examiner

Figure 1 (Prior-Art)

Figure 2 (Prior-Art)

Figure 3 (Prior-Art)

Figure 4 (Prior-Art)

Figure 5 (Prior-Art)

Figure 6 (Prior-Art)

SECURE KM SWITCH

FIELD OF THE INVENTION

The present invention relates to a system that enables a computer user to securely share a single set of keyboard and mouse (KM) among multiple isolated computers. More particularly, the invention discloses a method apparatus and system to enable one set of peripheral devices to independently interact with multiple coupled isolated computers through mouse position analysis on a virtual display area corresponding to multiple physical user displays of the particular installation.

BACKGROUND OF THE INVENTION

There are many cases where a single user may need to access multiple isolated computing systems. Due to security reasons it may be critical that isolated computing systems will not be connected together to prevent potential data leakages and to block certain security attacks. Any peripheral device shared between two or more isolated networks may be a target for external or internal attackers. Common attack strategy is to cause a permanent or temporary data leakage path between the two coupled networks to enable data theft, unauthorized data modification or unauthorized data import. To allow a single user to operate multiple computers coupled to multiple isolated networks KVM (Keyboard Video Mouse) switch may be used. KVM switch connected to one set of user keyboard, mouse and display on one side and to multiple computers on the other side provides the user with the ability to interact with one specific computer at a time.

One specific scenario area of concern is leakage between a classified computer system or network and a non-classified network such as a network attached to the internet. Such leakage may serve as an agent inside the classified network to send classified data to unknown hostile organizations in any location in the world.

Over the past years there were several common solutions for single user operating multiple isolated computers:
1. Using multiple displays and multiple sets of user peripheral devices.
   Some organizations are enforcing isolation by placing two or more isolated sets of user peripheral devices on the user's desktop. Isolation is assured as there is no electrical contact between the multiple computers. Major disadvantage of this solution is its inherent reduced usability. Users find it hard to divert their attention between multiple systems. This solution also takes additional valuable user desktop space. If more than two isolated computers needed for a user, these usability and desktop space disadvantages tend to get worsen.
2. Using KVM switch or Secure KVM to enable user interaction with multiple isolated computers through one set of peripherals. This solution reduces the desktop space needed and provides better usability. As conventional KVMs may leak data between coupled isolated computers, in many cases a Secure KVM is used. This type of KVM provides higher assurance that coupled computers would not leak data to one another. While this solution provides better usability, it is not suitable for users that need to see multiple displays simultaneously. Users such as traders need to see various data from multiple sources presented at all time on multiple displays. Although some secure KVMs supporting multiple displays available today, this solution tends to be less flexible and relatively expensive.
3. Using KM (Keyboard Mouse) switch to enable user interaction with multiple isolated computers through multiple isolated displays and one set of keyboard and mouse. Shared keyboard and mouse through software or hardware KM provides access to multiple computers by means of manual switching or even continues virtual display. Unlike KVM the KM switches only the keyboard and mouse, while the display outputs are not passed or switched through the KM.

What is needed is a secure KM switch that enables secure isolation between the coupled computers. Such needed device will enable seamless user interaction with the isolated computers while viewing multiple displays. The needed secure KM switch will require minimal software and hardware installation in the coupled computers.

Information on some commercially available systems may be found in:
1. Adder TS4 Four-port keyboard and mouse switch User's Manual (http://www.adder.com/uk/products/Manuals/TS4/ADDER_TS4_v1_1c.pdf)
2. Adder CCS4USB Four-port keyboard and mouse switch User's Manual (http://www.adder.com/UK/products/Manuals/CCS4-USB/AdderCCS4-USBv2-0d.pdf)
3. Actionstar USB KM switch specifications (http://www.actionstar.com.tw/products_details.php?l=0&pro_id=81)
4. Waterfall Remote Screen View, from Waterfall™ Security Solutions Ltd. (http://www.waterfallsecurity.com/remote-screen-view/)
5. Multiplicity from Stardock Corporation, (http://www.stardock.com/products/multiplicity/)

OTHER REFERENCED PATENTS AND APPLICATIONS

1. United States Patent Application 2002/0105553; to Marc Segre; "Automated Keyboard Mouse Switch".
2. United States Patent Application 2010/0185797; to Hsi-Jung Tsai, et. al.; "Keyboard-Mouse Switch and Switching Method Thereof".
3. U.S. Pat. No. 5,825,357; to Mark Malamud; "Continuously accessible computer system interface".

SUMMARY OF THE INVENTION

The present invention, relates to a Secure KM (Keyboard Mouse) switch to be used with multiple isolated computers and multiple displays.

More particularly, the invention presents a secure KM switch having unidirectional enforced data flow from user peripherals to coupled hosts to prevent data leakages and successful signaling attacks. Secure KM switch having the security functions disclosed herein may be used to enable single user having single set of user keyboard and mouse to comfortably interact with a plurality of isolated computing devices such as: personal computer desktops, thin-clients, laptop computers, tablet computers, PDAs, cellular phones etc.

According to an exemplary embodiment of the current invention, a secure KM switch is provided, comprising:

Keyboard peripheral port to connect a standard user keyboard through bi-directional serial interface such as USB or P/2. Inside the Secure KM Switch the peripheral port is coupled to a keyboard host emulator function connected through keyboard channel select switch to unidirectional flow forcing functions at the other side. Keyboard host emulator communicates with the user keyboard through standard bidirectional peripheral protocol such as USB or PS/2 and translates user key-codes into standard or proprietary unidirectional serial protocol. This standard or proprietary serial protocol is then passed through a unidirectional flow forcing function to assure that data will only flow from the keyboard host emulator function to the keyboard device emulator of the selected channel. A keyboard channel select switch controlled by the System Controller function switches the said standard or proprietary unidirectional serial protocol data only to one host channel at a time. In each host channel, the keyboard device emulator function translates the incoming data back into standard bi-directional keyboard data flow. A serial jack at the Secure KM switch panel couple this bi-directional data into the selected host port via a connecting cable. This keyboard peripheral security function assures that data cannot flow back into the keyboard port and also assures that only qualified keyboard will be enumerated and supported by the Secure KM switch device.

A Mouse peripheral port to connect a standard user mouse or pointing device through bi-directional serial interface such as USB or P/2. Inside the Secure KM Switch the mouse peripheral port is coupled to a mouse host emulator function connected through the mouse channel select switch to unidirectional flow forcing functions at the other side. Mouse host emulator communicates with the user mouse through standard bidirectional peripheral protocol such as USB or PS/2 and translates user mouse commands into standard or proprietary unidirectional serial protocol. This standard or proprietary serial protocol is then passed through a unidirectional flow forcing function to assure that data will only flow from the mouse host emulator function to the mouse device emulator of the selected channel. A mouse channel select switch controlled by the System Controller function switches the said standard or proprietary unidirectional serial protocol data only to one host channel at a time. In each host channel the mouse device emulator function translates the incoming data back into standard bi-directional mouse data flow. A host mouse jack at the Secure KM switch panel couple this bi-directional data into the selected host serial port via a connecting cable. This mouse peripheral security function assures that data cannot flow back into the mouse port and also assures that only qualified mouse will be enumerated and supported by the Secure KM Switch device.

Approved user authentication device may be coupled into the Secure KM Switch user authentication device dedicated port that is coupled to the user authentication device mode switch. During initial connection or power up, this switch couples the user authentication device dedicated port into the qualification microcontroller function. This qualification microcontroller function enumerates the coupled user authentication device and checks if it is a qualified device based on preprogrammed qualification criterions. The same qualification microcontroller function drives the said user authentication device mode switch. Once the device is qualified the qualification microcontroller move the user authentication device mode switch to couple the connected device to one of the host ports through channel select switch controlled by the System Controller function. Each one of the One enhancement of this security function is through the use of a monitoring function that monitors the peripheral port and the traffic after initial qualification to detect certain abnormalities. Once an abnormality is being detected, the monitoring function drives the qualification microcontroller to revert back to qualification mode.

In some embodiments the additional circuitry is comprises a monitor-able USB hub, and wherein said peripheral switch is coupled to one peripheral port through the monitor-able USB hub.

Another further enhancement of this security function is achieved through additional physical/electrical port monitoring function. This function detects physical connector removal, current draw to the device or ground plane continuity to alert the qualification microcontroller in case that device was disconnected from the port.

Alternative embodiment of the present invention may be implemented using a dedicated user authentication peripheral port coupled to a user authentication port host emulator. This host emulator is coupled through a standard or proprietary bidirectional communication link to a user authentication device emulator that is coupled into the channel select switch and coupled computers peripheral port. This arrangement prevents direct read-write access between the computer port and the device and therefore reduces the risk of data leakages through attacks on the user authentication system.

In some embodiments the qualification controller, host emulator, device emulator are field programmable to enable field customization to specific peripherals.

In some embodiments of the present invention a Trusted Platform Module (TPM) may be added on the Secure KM Switch to further enhance computer security. TPM may be coupled to above mentioned peripheral security functions to enable reporting and logging of suspected peripheral ports attack events. It should be noted that peripheral attack events may be aimed at computer ports side (internal attacks) or at the secure port side (external attack).

TPM or anti-tampering events and logs may be routed to a coupled host or through a dedicated out-of-band management channel. A trust chain from one or more of the coupled trusted computers may be extended to the secure KM switch using TPM authentication.

In some embodiments of the present invention the Secure KM Switch is further having audio switching circuitry to enable computer audio out or audio in channel switching synchronously or asynchronously with the channel selection.

Another aspect of the invention is to provide a secured multi-computer system using a KM switch comprising: a secure KM switch apparatus comprising: a user keyboard port capable of interfacing with a user keyboard; a keyboard host emulator to emulate computer host coupled to user keyboard port on one side and to keyboard channel select switch on the other side; at least one unidirectional flow forcing circuitry to assure that data is only flowing from keyboard channel select switch to coupled keyboard device emulators and no other data may flow from the keyboard device emulators back to the keyboard channel select switch and to the coupled keyboard host emulator; a keyboard channel select switch controlled by System Controller function to connect only one selected channel keyboard device emulator to the said unidirectional flow forcing circuitry at a time; a plurality of keyboard device emulators, to emulate a standard keyboard or replicated identity of user keyboard for each one of the coupled computer channels through host keyboard ports; a plurality of host keyboard ports for coupling coupled computers through cables; a user mouse port to connect a standard user mouse or pointing device; a mouse host emulator to emulate computer host coupled to user mouse port on one side and to mouse channel select switch on the other side; at least one unidirectional flow forcing circuitry to assure that data is only flowing from said mouse channel select switch to coupled mouse device emulators and no other data may flow from the mouse device emulators back to the mouse channel select switch and to the coupled mouse host emulator; a mouse channel select switch controlled by System Controller function to connect only one selected channel mouse device emulator at a time to the said unidirectional flow forcing circuitry; a plurality of mouse device emulators to emulate standard mouse device for each one of the coupled computer channels through host mouse ports; a plurality of host mouse ports for coupling coupled computers through cables; and a System Controller function to control said keyboard channel select switch and mouse channel select switch based on user inputs;

and at least a first and a second mutually isolated computer systems, each comprising: a computer having: a computer keyboard port coupled through said cables to said respective host keyboard port; a computer mouse port coupled through said cables to said respective host mouse port; and a display coupled to said computer, wherein: only one of said first and second computer systems is controlled bay said user keyboard and user mouse at the time, and no information may be exchanged between said first and second mutually isolated computer systems through said secure KM switch apparatus.

In some embodiments the first and second computer systems are connected to a first and a second different networks, and no information may be exchanged between said first and second networks through said secure KM switch apparatus.

Yet another aspect of the invention is to provide a method of securely coupling a plurality of computer systems to a single keyboard and a single mouse comprising: connecting a single user mouse a host emulator capable of extracting mouse commands from said user mouse; selecting one of a plurality of isolated computer systems to receive said extracted mouse commands; passing said extracted mouse commands to said selected isolated computer system through a unidirectional flow forcing circuitry and a device emulator.

In some embodiments the method further comprises connecting a single user keyboard a host emulator capable of extracting mouse commands from said user keyboard; and passing said extracted keyboard commands to said selected isolated computer system through a unidirectional flow forcing circuitry and a device emulator.

In some embodiments passing the extracted keyboard commands to the selected isolated computer system is through a keyboard device emulator; and passing the extracted mouse commands to the selected isolated computer system is through a mouse device emulator.

Unlike the prior-art KVMs or Secure KVMs this KM does not affect the video output of the coupled computers. Each one of the computers or video sources coupled to the Secure KM Switch system is independently coupled to a single or multiple isolated displays.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 6:
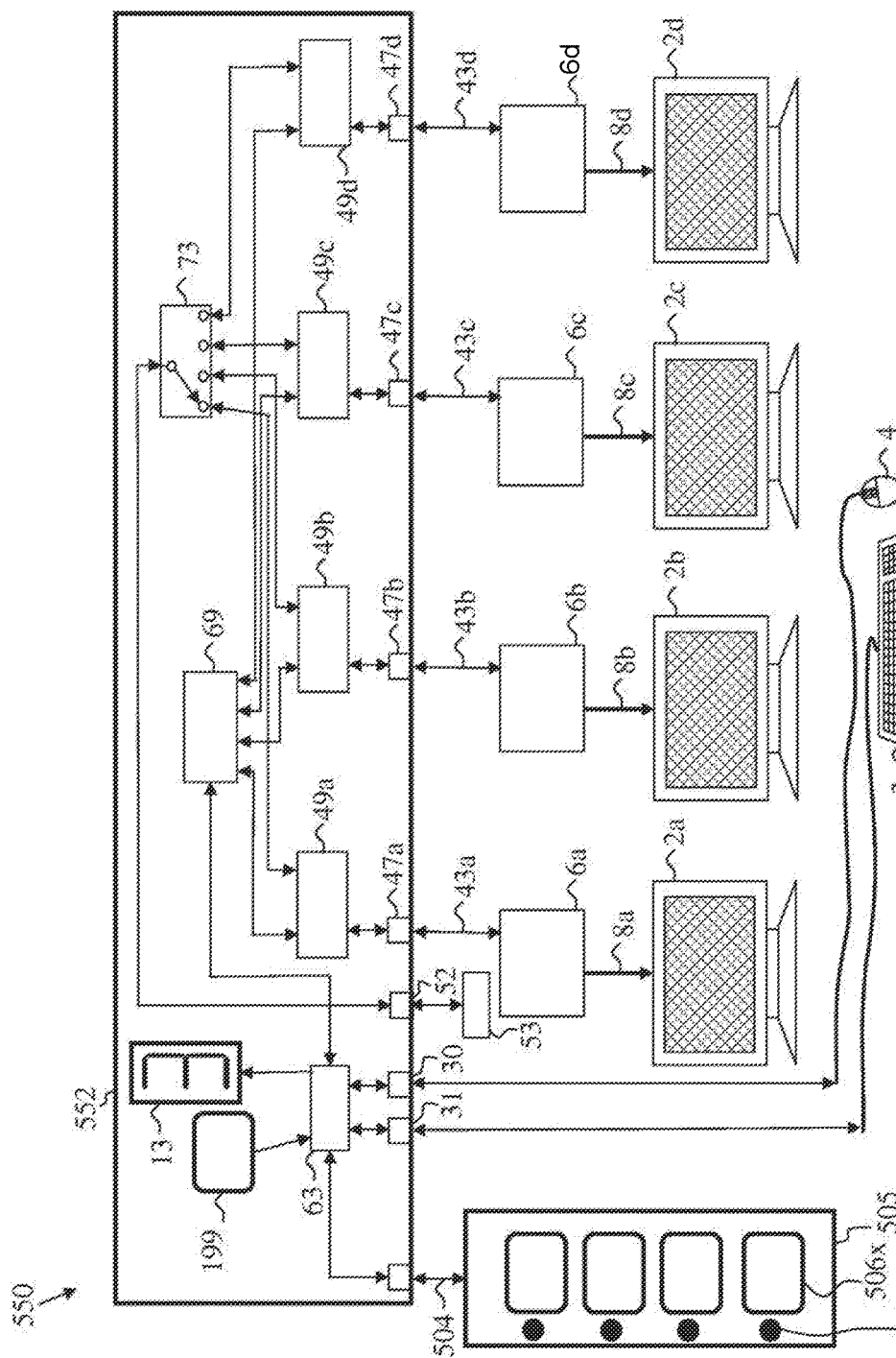

FIG. 6 illustrates another high-level block-diagram of a prior art multiple computers system having multiple independent display and a non-secure KM switch. In this system computers are not linked together with serial interconnect cables. Mouse host emulation enables user pointer location tracking by the KM switch.

Figure 7:
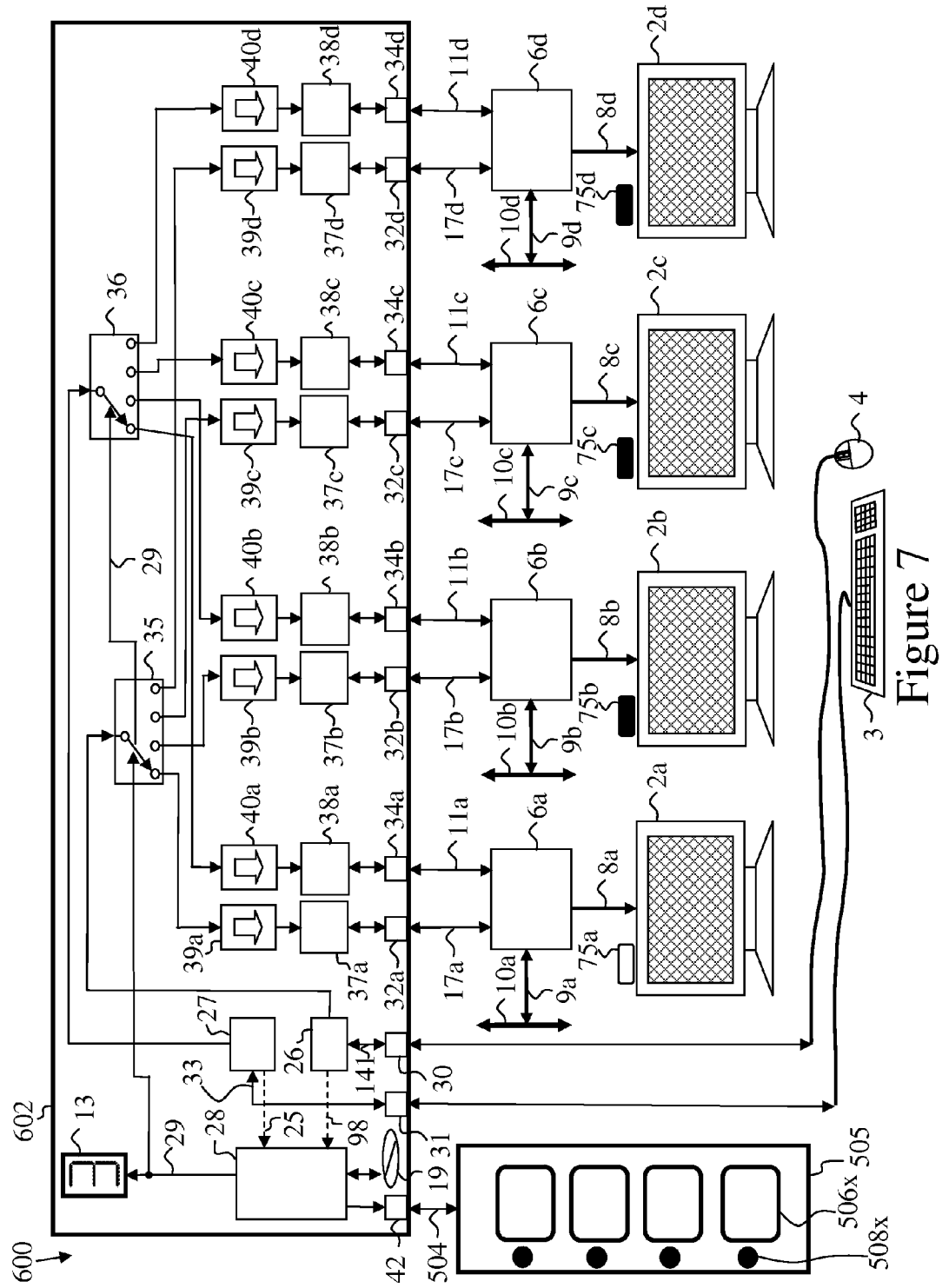

FIG. 7 illustrates a high-level block-diagram of a system having multiple displays coupled directly to the multiple computers and having a secure KM switch to enable user interaction with a single set of keyboard and mouse according to an exemplary embodiment of the present invention.

Figure 8:
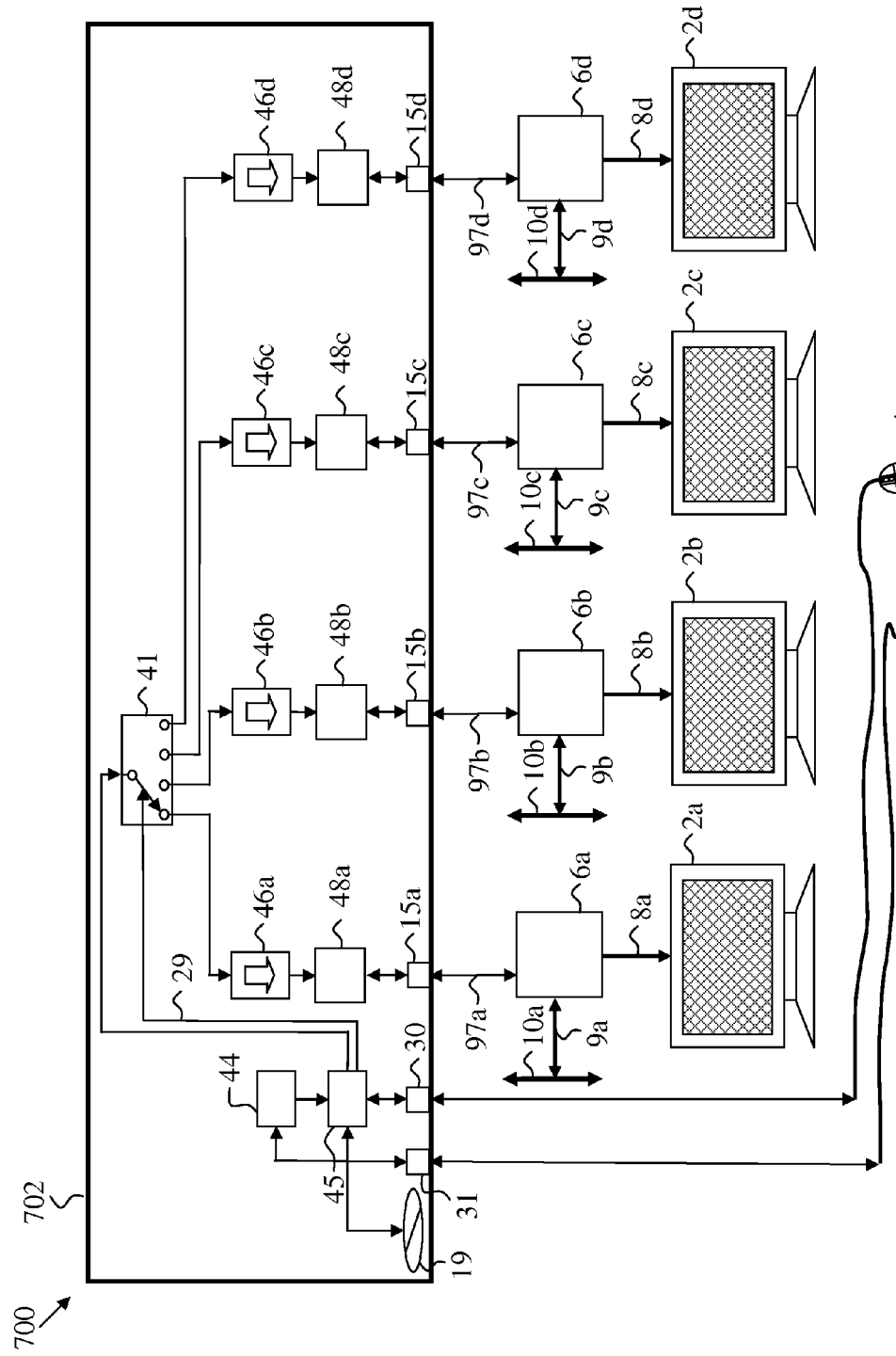

FIG. 8 illustrates a high-level block-diagram of a system having multiple displays coupled directly to the multiple computers and having a secure KM switch with some integrated emulation functions to enable user interaction with a single set of keyboard and mouse according to another exemplary embodiment of the present invention.

Figure 9:
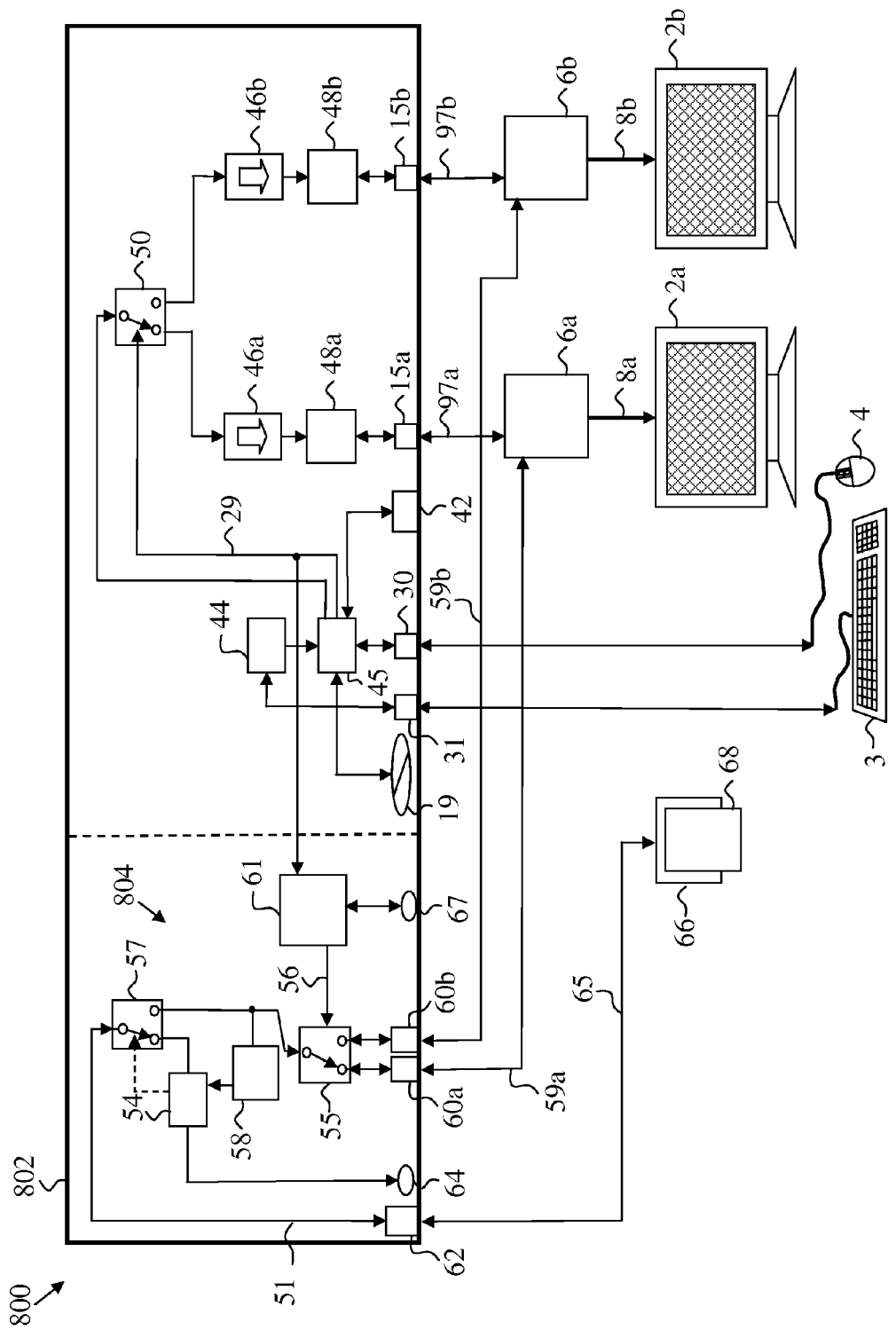

FIG. 9 illustrates a high-level block-diagram of a system similar to FIGS. 7 and 8 above; having a secure KM switch with additional dedicated peripheral port function according to an exemplary embodiment of the present invention.

Figure 10:
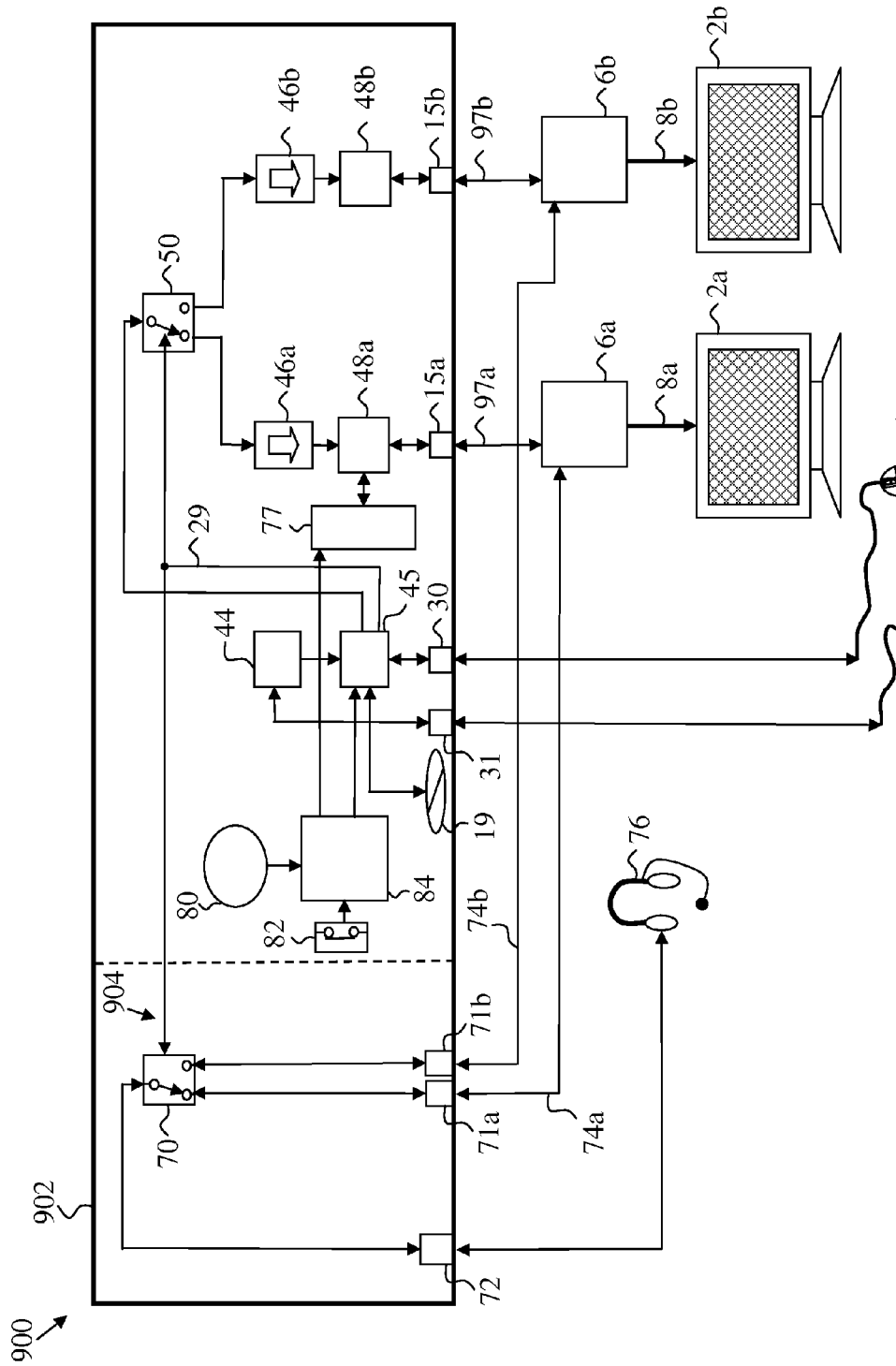

FIG. 10 illustrates a high-level block-diagram of a system similar to FIGS. 7, 8 and 9 above having a secure KM switch with additional audio switching and active anti-tampering functions according to another exemplary embodiment of the present invention.

Figure 11:
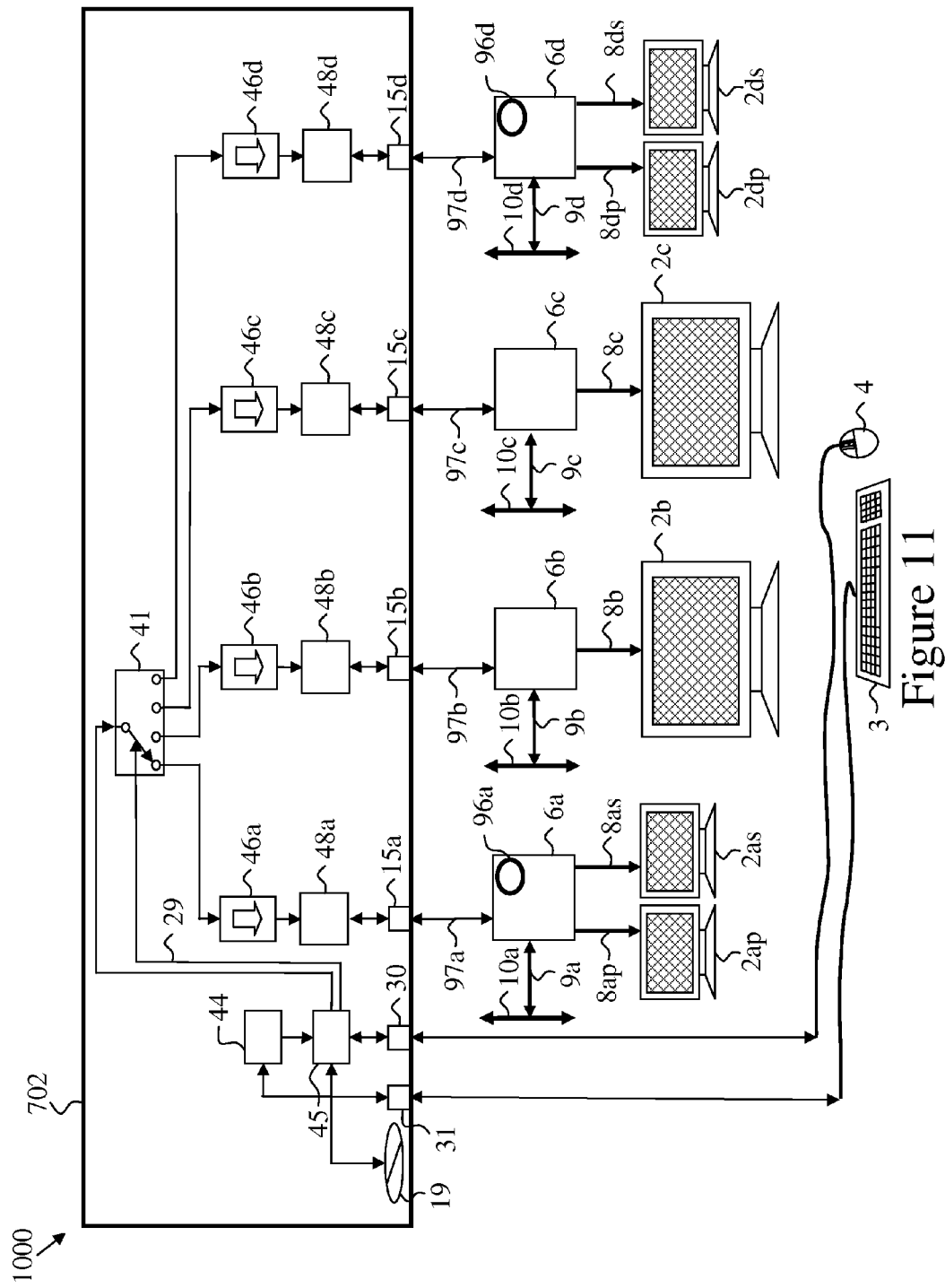

FIG. 11 illustrates a high-level block-diagram a system similar to FIGS. 7 and 8 above having a secure KM switch with two coupled computers each driving dual displays according to yet another exemplary embodiment of the present invention.

Figure 12:
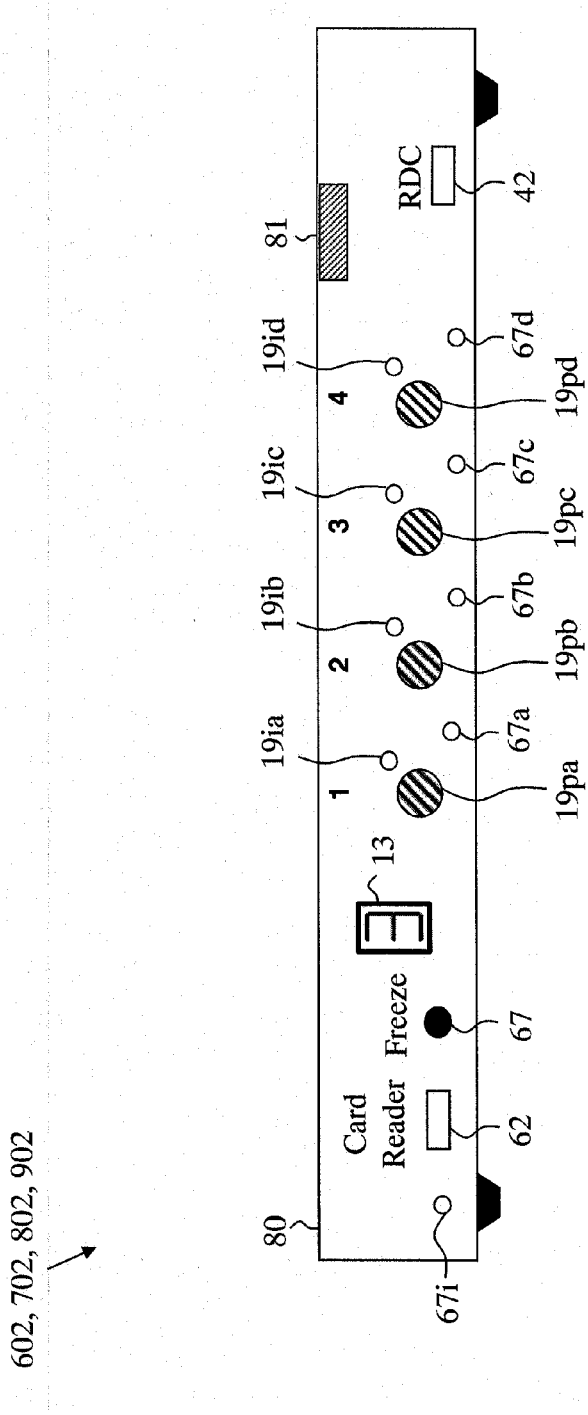

FIG. 12 illustrates a front panel layout according to an exemplary embodiment of the present invention.

Figure 13:
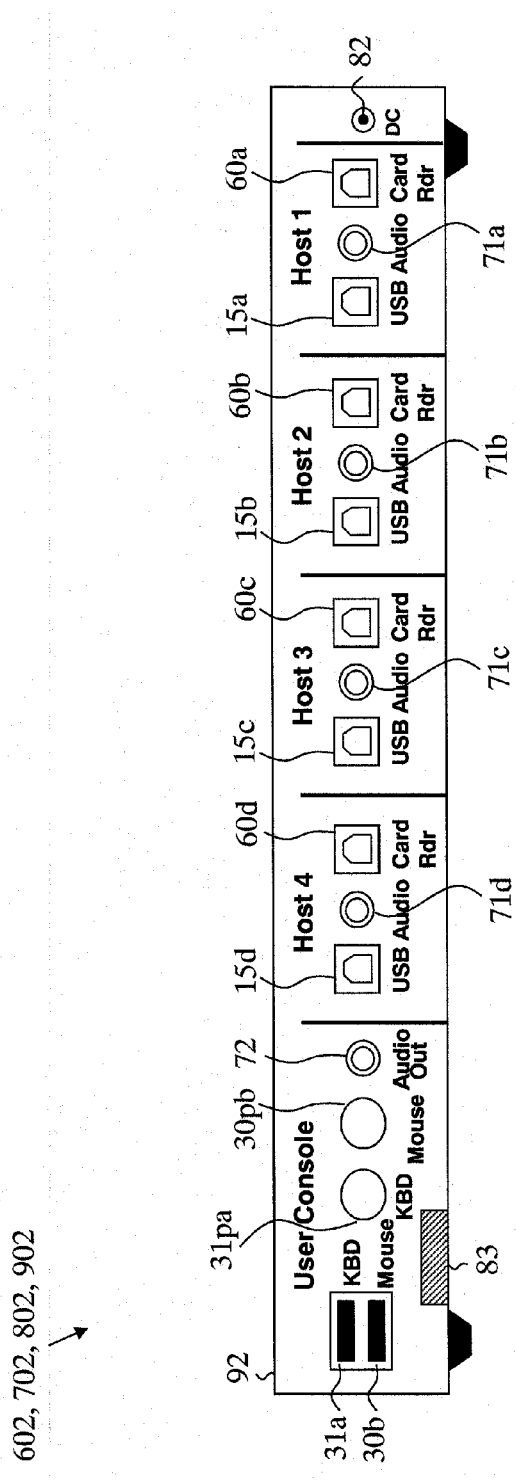

FIG. 13 illustrates a rear panel layout according to an exemplary embodiment of the present invention.

Figure 14:
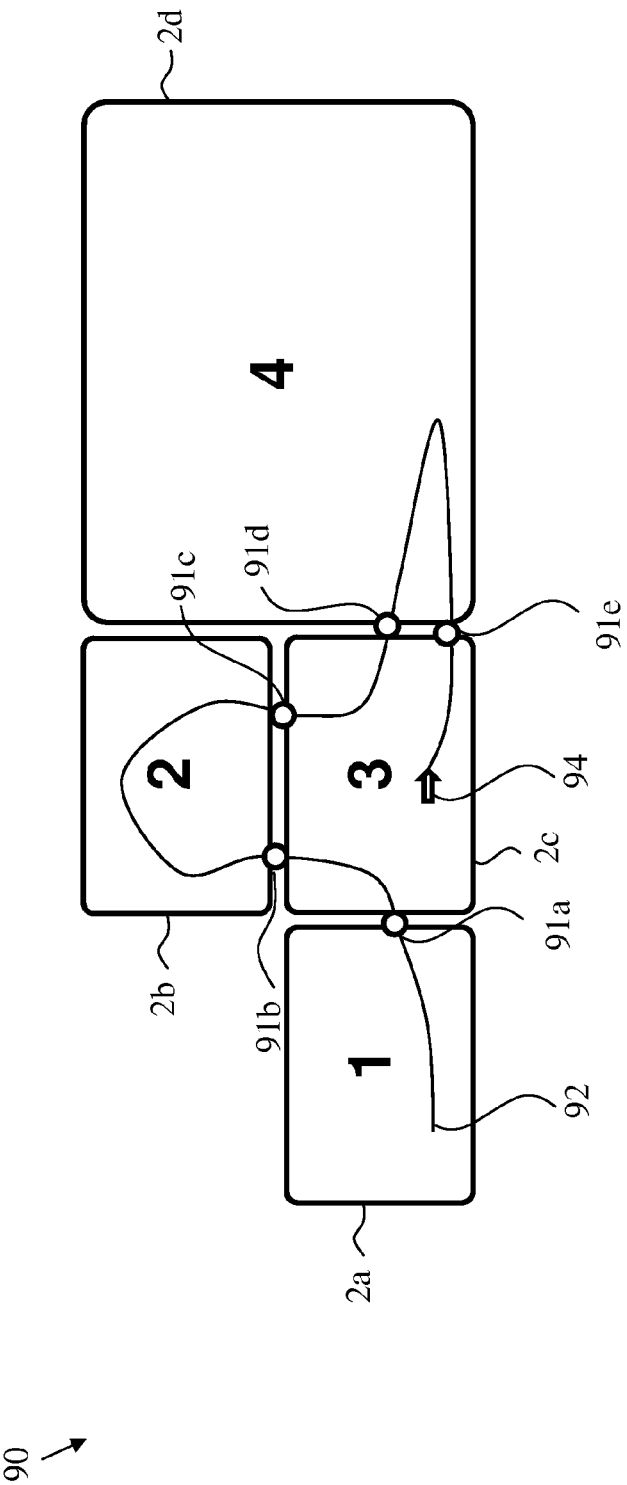

FIG. 14 illustrates an exemplary display arrangement to better illustrate the cursor tracking channel select mode of exemplary embodiment of the present invention.

Figure 15:
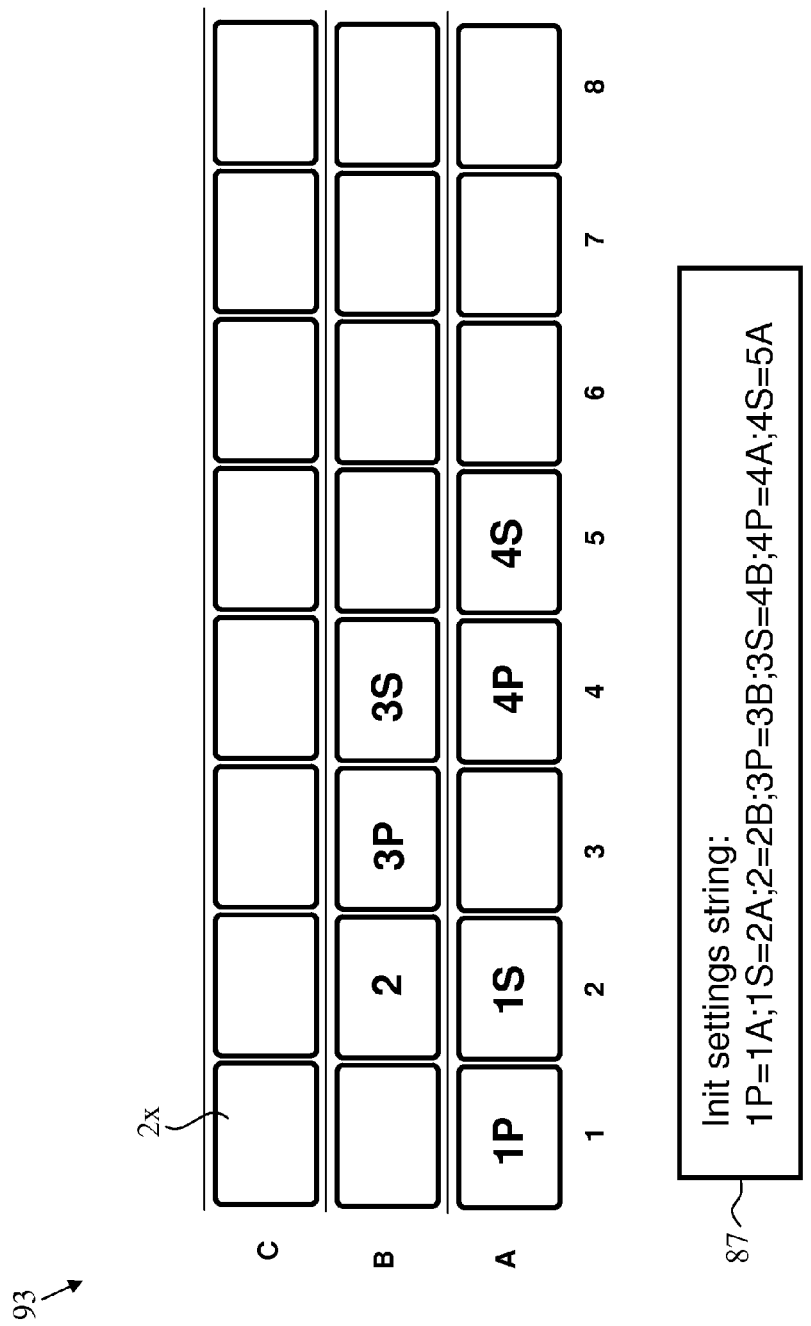

FIG. 15 illustrates a method to be used to enable secure KM switch displays setting programming for a plurality of identical displays according to an exemplary embodiment of the current invention.

Figure 16:
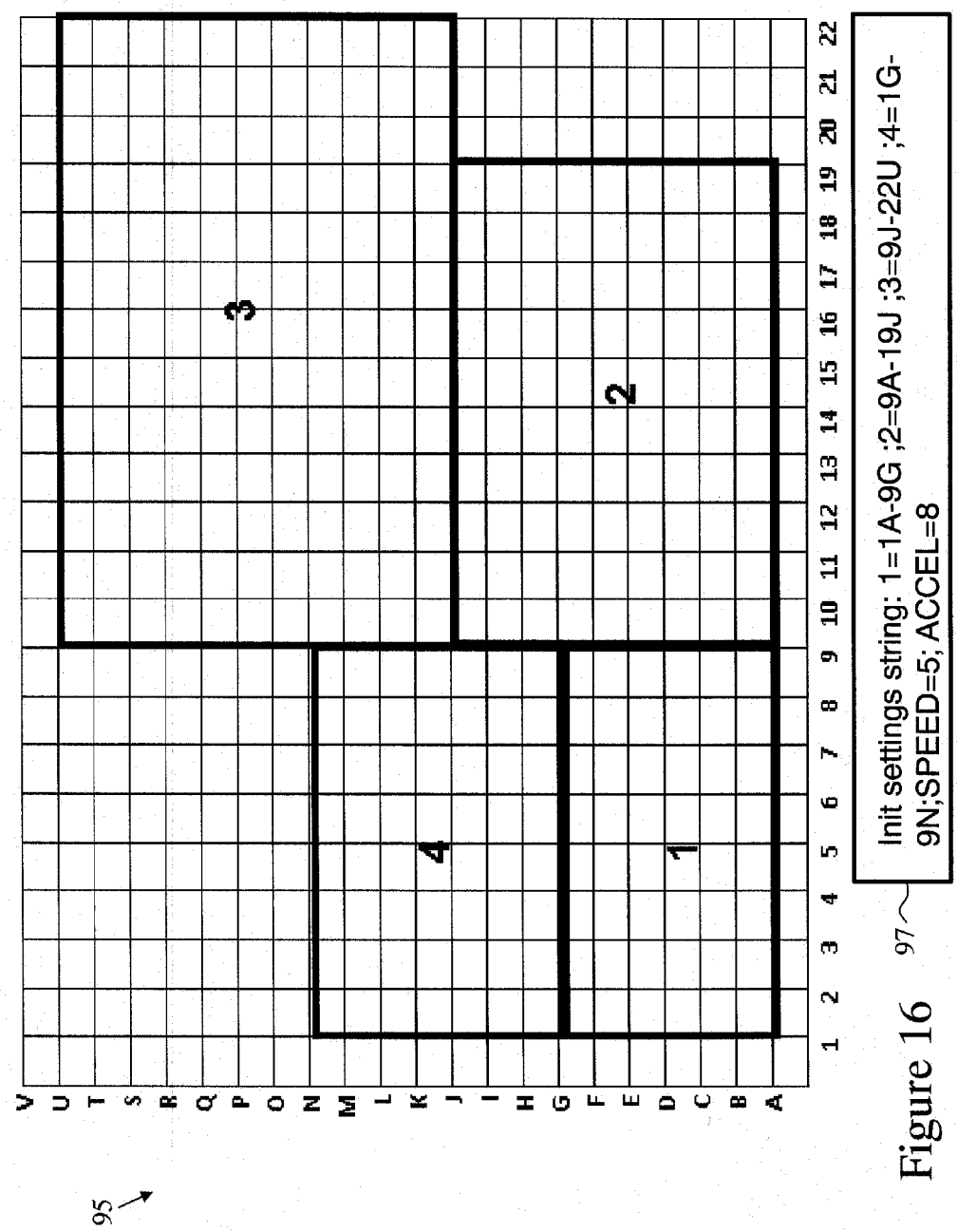

FIG. 16 illustrates a method to be used to enable secure KM switch displays and user settings programming according to an exemplary embodiment of the current invention. In this figure coupled displays are of different size.

DETAILED DESCRIPTION OF THE DRAWINGS

Before explaining at least one embodiment of the invention in detail, it is to be understood that the invention is not necessarily limited in its application to the details set forth in the following description or exemplified by the examples. The invention is capable of other embodiments or of being practiced or carried out in various ways.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements may have been omitted from some of the drawing.

Figure 1:
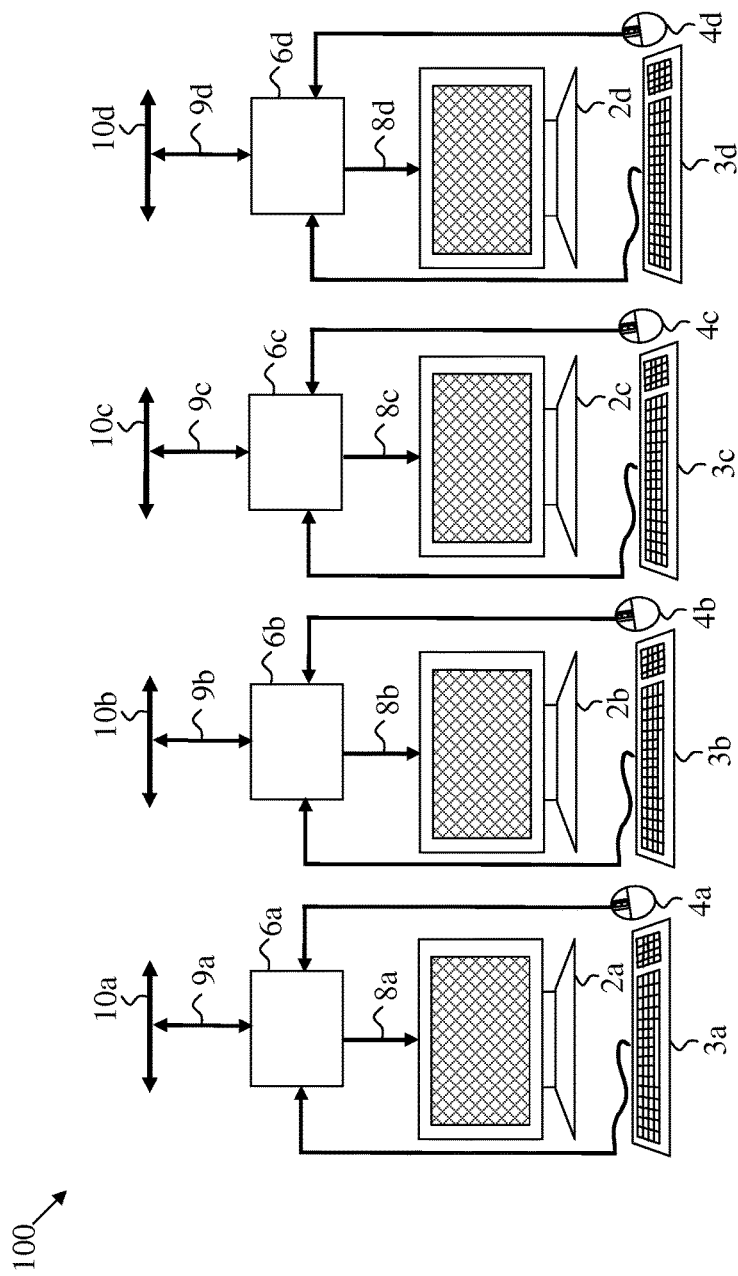
FIG. 1 illustrates a high-level block-diagram of a prior-art multiple isolated computers system having multiple independent displays and independent keyboards and mice.

FIG. 1 illustrates a high-level block diagram presenting of a prior art system 100 having 4 isolated computers 6a to 6d each coupled to a separate local area network (LAN) 10a to 10d through LAN cables 9a to 9d respectively.

The 4 isolated computers 6a to 6d are also independently coupled to one user display 2a to 2d through video cables 8a to 8d respectively. Isolated computers 6a to 6d may comprised of Personal Computers, Portable computers, docking stations, Personal Digital Assistant, Smart Phones, Thin-clients, Servers, workstations, terminals etc.

User displays 2a to 2d may be identical type and size or different type or size. User displays may be arranged in horizontal line in front of the user or in any other desired arrangement visible to the user.

Each one of the 4 computers 6a to 6d is further coupled to its independent keyboard 3a to 3d and mouse 4a to 4d.

While this prior art system 100 assures that computers 6a to 6d would not leak information between each other or between coupled networks 10a to 10d, it lacks the ease of use from the user stand-point. The use of 4 different sets of display keyboard and mouse take a large desktop area and may confuse the user. In many cases users will tend to reject this prior-art system due to these and other usability issues.

Figure 2:
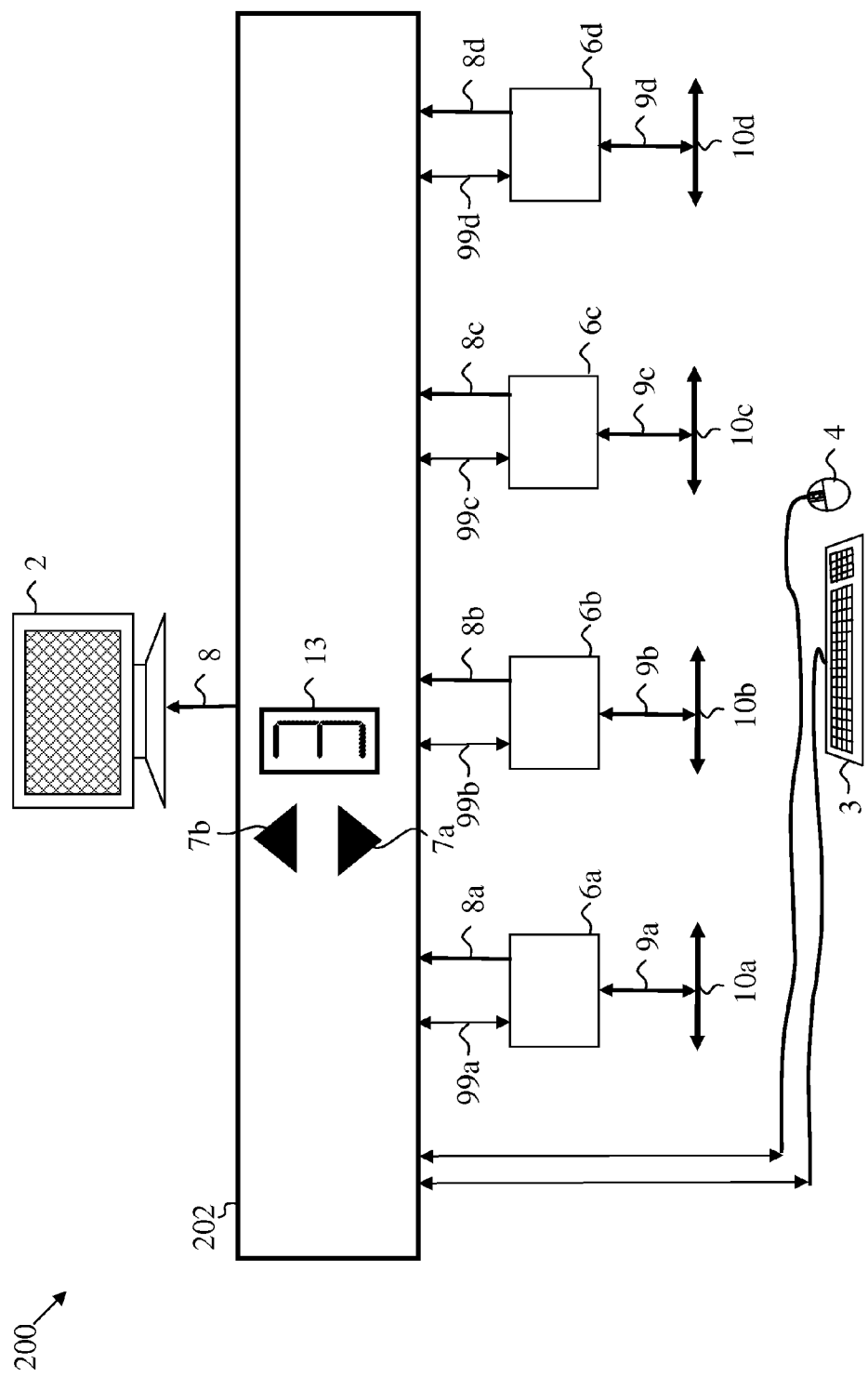
FIG. 2 illustrates another high-level block-diagram of a prior-art multiple isolated computers system having a conventional KVM to enable use of a single set of user keyboard, mouse and display.

FIG. 2 illustrates a high-level block diagram of another prior-art system 200. This system 200 is having a 4 channels KVM device 202 to improve system usability. KVM device 202 may be a conventional KVM, KVM Combiner, Secure KVM or any other type of switching appliance to enable sharing of keyboard 3, mouse 4, and display 2 with 4 coupled computers 6a to 6d. The 4 computers 6a to 6d are typically coupled to 4 isolated networks (LAN or WAN 10a-d) through 4 LAN cables 9a to 9d respectively. In this prior art system the user uses a single keyboard 3 and mouse 4, switched by the KVM device 202 to access one of the coupled computers 6a to 6d. The user may select one of the 4 KVM channels by pressing channel down key 7a or channel up key 7b and see the number of the selected channel in display 13. User may also select a channel by typing a pre-programmed key sequence in attached keyboard 3 or by mouse keys and pointer selection if KVM 202 is a KVM Combiner capable of intercepting and interpreting such key sequences or pointer selections.

Computers 6a to 6b are coupled to the KVM 202 through video output cables 8a to 8b and peripheral cables 99a to 99d that are typically Universal Serial Bus (USB) type cables. User display 2 is connected to the KVM 202 through display output cable 8. KVM 202 switches user selected channel video into the attached display 2.

This prior art system may be properly isolated and secure if a secure KVM device is used.

From operational standpoint, unless a KVM 202 is a KVM combiner—the user may not monitor all 4 computers simultaneously. The KVM 202 allows only one computer 6a to 6d generated video to be displayed in display 2. This limitation may be difficult for users that need to monitor various real-time data presented by all 4 computers 6a to 6d.

One way to overcome this limitation with this system 200 is to connect 4 different displays directly to computers 6a to 6d and avoid the video switching function of the KVM 202. While this setup may work, it does not enable mouse cursor control of selected channel.

Figure 3:
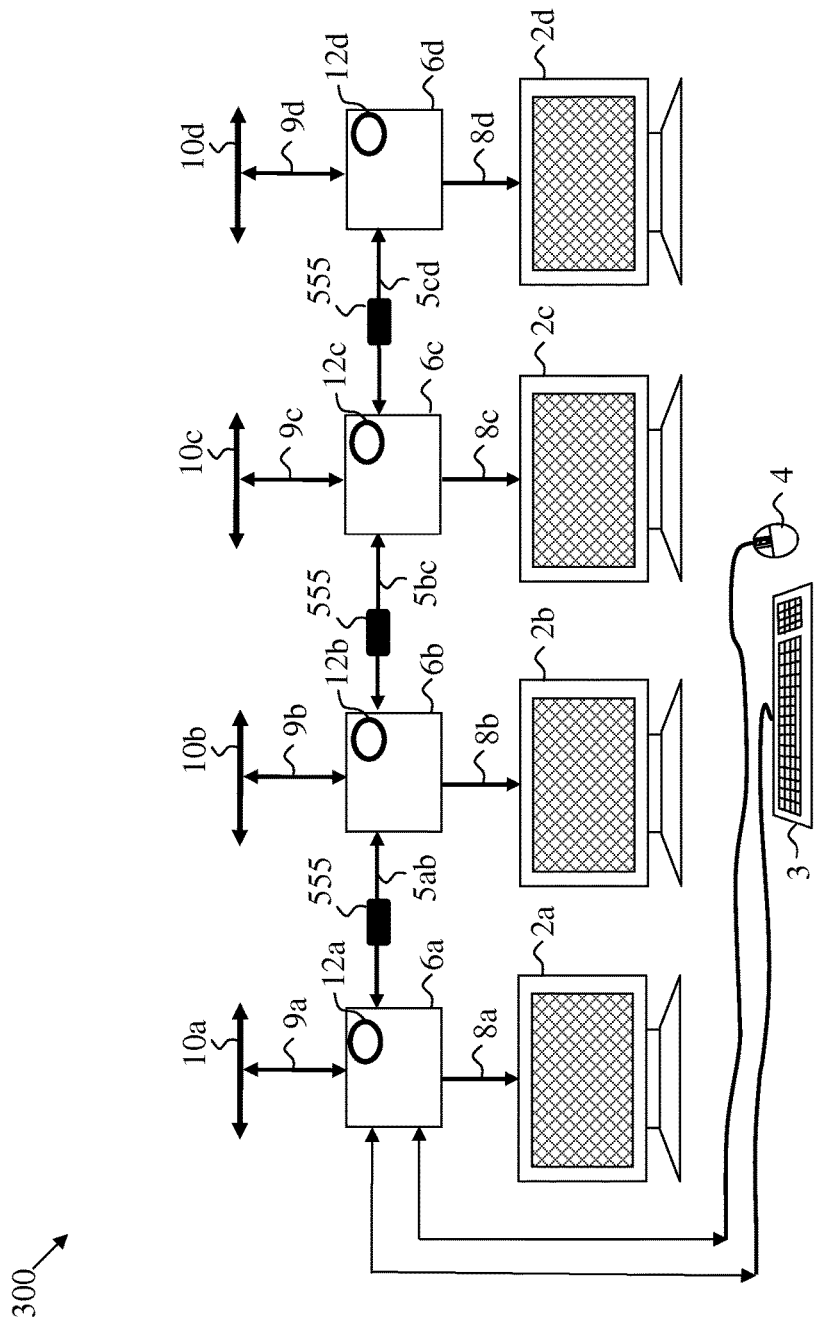
FIG. 3 illustrates yet another high-level block-diagram of a prior art multiple computers system having serial interconnect cables and local software applications to synchronize a single set of user keyboard and mouse with multiple connected computers.

FIG. 3 illustrates a high-level block diagram of yet another prior art system 300 having 4 computers 6a to 6d running KM (Keyboard Mouse) Switch application software 12a to 12d to enable single keyboard 3 and single mouse 4 to interact with all 4 computers 6a to 6d. The 4 computers 6a to 6d in this system 300 are typically coupled to 4 isolated networks 10a to 10d (LAN or WAN) through 4 LAN cables 9a to 9d respectively.

User keyboard 3 and mouse 4 are connected to first computer 6a running KM switch application software 12a. Through the use of special interconnect serial cable 5ab application 12a communicates with application 12b of second computer 6b. When user moves the cursor near the right side border of attached display 2a, application 12a notifies application 12b through serial cable 5ab. Serial cable 5ab may be a simple passive cable or a dedicated active cable having internal electronic module 555 such as USB to USB active cable. Application 12b then causes the local cursor in computer 6b to appear at the left border of second display 2b. At the same time keyboard 4 is switched to the second computer 6b through the same path. The user may feel like operating a single desktop spanning across different displays 2*a* to 2*d* coupled to computers 6*a* to 6*b*. KM Switching applications 12*a* to 12*c* may also enable setup program to define different arrangements of user displays (in columns/rows or combination thereof).

While this prior-art system 300 provides user ease of use, it suffers from significant security disadvantages. The serial cables 5*ab*, 5*bc* and 5*cd* provide a potential data leakage path between the coupled computers and between the coupled networks. In many cases organizations would not allow such interconnect to be made as it can be used by attackers to propagate inside their classified networks. Another disadvantage of this prior-art system is that it is relying on software applications that must be installed in each of the coupled computers. This software installation is undesirable and in many cases impossible as computers may run different operating systems or implemented using custom hardware.

Figure 4:
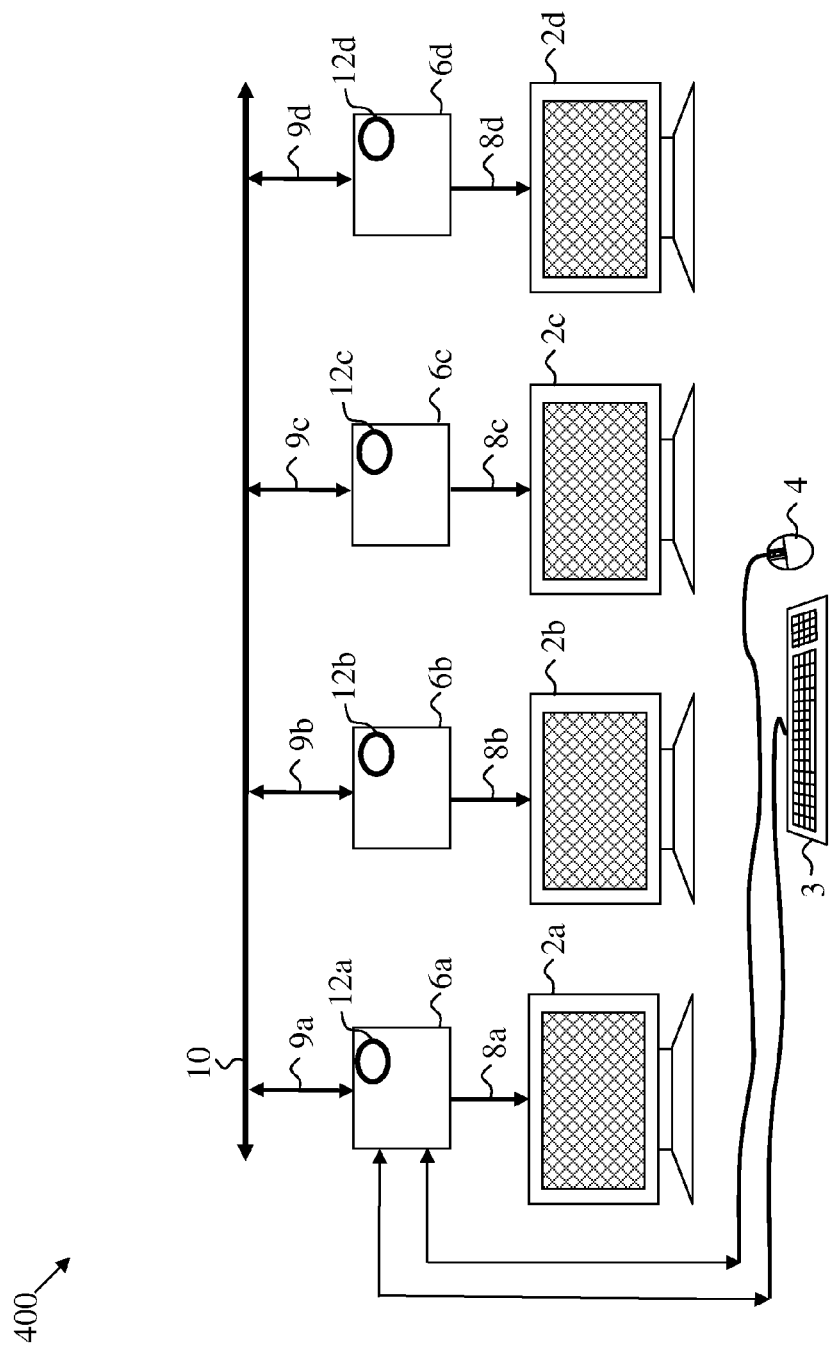
FIG. 4 illustrates a high-level block-diagram of yet another prior art multiple computers system having common LAN (Local Area Network) interconnect and local software applications to synchronize a single set of user keyboard and mouse with multiple connected computers.

FIG. 4 illustrates a high-level block diagram of yet another prior-art system 400 similar to system 300 of FIG. 3 above, but in this system instead of using the serial cables 5*ab* to 5*cd*, the system uses the attached LAN 10 (Local Area Network) to communicate and synchronize between computers. This type of implementation is completely unsecure as all computers 6*a* to 6*d* must communicate on the same LAN 10, thus computers 6*a* to 6*d* cannot be isolated.

Figure 5:
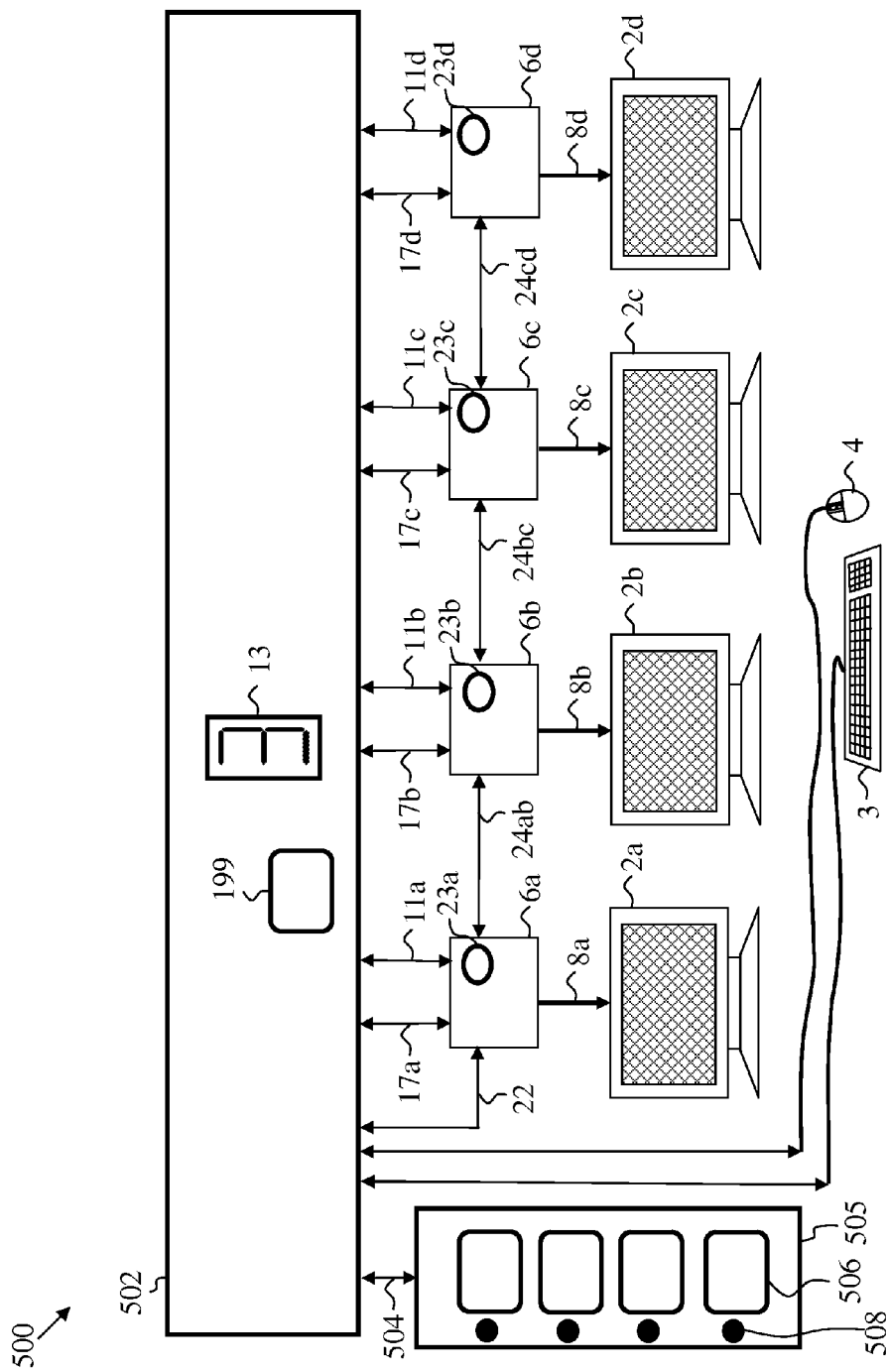
FIG. 5 illustrates another high-level block-diagram of a prior art multiple computers system having multiple independent display and a non-secure KM switch. In this system computers are linked together with serial interconnect cables to enable synchronized user interaction with multiple connected computers through a single set of user keyboard and mouse.

FIG. 5 illustrates another high-level block diagram of yet another prior art system 500 having a 4 channels KM switch device 502. These prior art KM switches sometimes called trader KM switches as they are often used in financial trader environments. The KM switch 502 is coupled to the 4 computers 6*a* to 6*d* through USB keyboard cables 11*a* to 11*d* respectively and USB mouse cables 17*a* to 17*d* respectively. Each of computers 6*a* to 6*d* is coupled with one display 2*a* to 2*d* respectively. User keyboard 3 and mouse 4 are connected to the KM switch 502 through USB or PS/2 ports. User can select between computers 6*a* to 6*d* by pressing channel toggle push button 199 while monitoring selected channel number in 7-segment display 13. Another method of user channel selection is by user typing of a pre-defined keys sequence. Another accessory offered with some prior-art KM switches is a cable 504 connected remote controller 505, having channel selection push buttons 506 and status LEDs 508. This remote controller 504 may be positioned on the user desktop while KM switch 502 is remotely installed behind the desktop cabinets.

Another optional feature of this exemplary prior-art KM switch is the use of the mouse cursor to enable user channel selection (Cursor Tracking Mode). Serial cable 22 connected between the KM switch 502 and the first computer 6*a* enables communication and cursor synchronization through special installed application 23*a*. Additional serial interconnect cables 24*ab* connecting first computer 6*a* and second computer 6*b* having similar software application 23*b* installed. Serial cable 24*bc* connecting computers 6*b* and 6*c* having similar software 23*c* installed. Serial interconnect cable 24*cd* connecting computers 6*c* and 6*d* having similar software application 23*d* installed. This chain of computers 6*x*, serial interconnect cables 24*xx* and applications 23*x* enables chaining and synchronization between all coupled computers and the KM switch 502. When the user is working in display 2*a* and computer 6*a*, the keyboard 3 and mouse 4 are switched through the KM switch 502 to computer 6*a* via USB cables 11*a* and 17*a*. Once the user moves the mouse cursor on display 2*a* close to the right side border the special application software 23*a* communicates with the special software application 23*b* through interconnecting cable 24*ab* and user mouse cursor reappears at the second display 2*b*. At the same time the KM switch 502 receive a message through cable 22 that the new channel selected is computer 6*b* and it switches the keyboard 3 and mouse 4 to the second computer 6*b* through USB cables 11*b* and 17*b*. This smooth transition between displays and computers enable seamless user control of the KM across different platform without the need to actively select a channel by pressing keys or push-buttons.

The major disadvantage of this prior-art system is the interconnect cables 24*xx* and their potential use by attackers in attempt to leak data between computers 6*x*. From security standpoint and interconnect between the computers 6*x* is undesirable. The concept of using 4 isolated computers with this KM switch is far more expensive than having a single computer with quad head connected (4 displays supported on 1 computer). The biggest motivation of building this prior-art system 500 with 4 isolated computers is security—keeping 4 isolated networks. Still this system 500 provides very little security due to the serial interconnect cables and the special software applications installed in each computer.

FIG. 6 illustrates another high-level block diagram of yet another prior art system 550 having a 4 channels KM switch device 552. This prior art KM switch is similar to the trader KM switch illustrated in FIG. 5 above and it is used primarily in the financial sector. In this prior-art KM switch mouse position tracking function does not require serial interconnect cables between coupled computers 6*x* but still it is relatively unsecure.

The KM switch 552 is coupled to the 4 computers 6*a* to 6*d* through the peripheral USB ports 47*a* to 47*d* and peripheral cables 43*a* to 43*d* respectively.

Each of computers 6*a* to 6*d* is also coupled with one display 2*a* to 2*d* respectively. Displays 2*a* to 2*d* may be identical or different type having different native display resolution.

User keyboard 3 and mouse 4 are connected to the KM switch 552 through a USB or a PS/2 user keyboard port 31 and user mouse port 30. User can select between computers 6*a* to 6*d* by pressing channel toggle push button 199 while monitoring selected channel number in 7-segment display 13.

Another method of user channel selection is by user typing of a pre-defined keys sequence or hot keys. Another accessory offered with some prior-art KM switches is a cable 504 connected remote controller 505, having channel selection push buttons 506*x* and status LEDs 508*x*. This remote controller 504 may be positioned on the user desktop while KM switch 502 is remotely installed behind the desktop cabinets.

Another option of this prior art KM switch 552 is to switch channel according to the user mouse pointer location. This option called sometimes Free-Flow Automated Mouse Switching Technology. The cursor location is analysed according to a predefined displays setup programming. Local software application or driver is not required in computers 6*a* to 6*d* as the host emulator 63 can detect pointer location and switch the required channel accordingly.

One or more USB peripheral devices 53 coupled through one or more peripheral ports 52 enable synchronous or asynchronous switching between computer channels 6*a* to 6*d*.

Inside this prior art KM switch 552 the peripheral USB ports 47*a* to 47*d* are coupled to USB hubs 49*a* to 49*d* allocated to each computer port so that each USB hub 49*a* to 49*d* upstream port is coupled to computer 6*a* to 6*d* respectively. The downstream ports of each USB hub 49*x* are coupled to peripheral switch 73 and to the emulator engine 69. Peripheral switch 73 controlled by the user channel selection inputs common side is coupled to the peripheral port 52. The emulation engine 69 provides keyboard and mouse device emulation to all coupled computers. When the computer channel is not selected by the user it generates the required USB keep-alive packets. When the computer channel is selected by the user, the emulation engine 69 interacts with the host emulator 63 that is coupled to the user keyboard 3 and mouse 4.

FIG. 7 illustrates a high-level block diagram of system 600 according to an exemplary embodiment of the current invention having a 4 channels secure KM switch device 602.

The Secure KM switch 602 is coupled to the 4 isolated computers 6a to 6d through USB keyboard host ports 34a to 34d, USB host cables 11a to 11d respectively. Similarly the USB mouse host ports 32a to 32d are coupled through USB mouse cables 17a to 17d respectively. The 4 computers 6a to 6d in this system 600 are coupled to 4 isolated networks (LAN or WAN) 10a to 10d through 4 LAN cables 9a to 9d respectively.

Computers 6a to 6d are coupled through video cables 8a to 8d to displays 2a to 2d respectively. The 4 displays 2a to 2d are preferably similar model and can be installed in any arrangement close to one another in horizontal line, vertical line or in any other combination suitable for the user. However, different types of displays having different native display resolution may be used.

User keyboard 3 is coupled to the secure KM switch 602 through a dedicated user keyboard port 31. User keyboard port 31 is coupled to the keyboard host emulator 27 through lines 33. Lines 33 may have ESD protection means, EMI filters and other electrical and safety protection means not shown here to prevent cluttering. Keyboard host emulator 27 enumerate and communicate with the coupled keyboard 15 using standard bi-directional peripheral protocol such as USB or PS/2. To simplify the discussion only USB protocol will be covered hereafter. It would be apparent to a man skilled in the art to implement the invention for the case in which PS/2 or other protocols are to be used. Keyboard host emulator 27 may be a microcontroller, ASIC, FPGA or any other suitable programmable device running a pre-programmed firmware or stat machine. The firmware/state-machine is designed to enumerate, initialize and enable only keyboard class peripheral devices and reject (disable) any other coupled devices. For example the following text describes an unknown USB peripheral that is being enumerated by the Keyboard host emulator 27:

When unknown USB peripheral device is first connected through the user keyboard port 31 to the keyboard host emulator 27, the USB device enumeration process is started. The enumeration starts by the keyboard host emulator 27 sending a reset signal to the unknown USB device. The data rate of the unknown USB device is determined during the reset signaling. After reset, the unknown USB device's information is read by the Keyboard host emulator 27 and the device is assigned a unique 7-bit address. If the unknown device is supported by the Keyboard host emulator 27 (based on pre-programmed criterions such as device class, sub-class, Vendor ID, Product ID etc), the keyboard device will be activated or enabled, set to a configured state and will establish standard keyboard communications with the Keyboard host emulator 27. If the secure KM switch 602 is restarted or a new peripheral device is reconnected, the above enumeration process is repeated.

Following enumeration and activation, the Keyboard host emulator 27 sends all keyboard data using a simplex serial standard protocol (such as RS-232, I2C, SPI) or proprietary unidirectional serial protocol through the keyboard channel select switch 36. Keyboard channel select switch 36 is controlled by channel select lines 29 driven by system controller function 28. Keyboard channel select switch 36 connects only one channel selected by the user to the unidirectional flow forcing circuitry 40a to 40d to the keyboard device emulator 38a to 38d respectively. Both keyboard host emulator 27 and keyboard device emulator 38x may be programmed to map and support not only basic keyboard keys but also multimedia keys, wheel, sliders and any required controls.

The unidirectional flow forcing circuitry 40x may be an optical isolator, electromagnetic isolator, logic driver, RF isolator or any other unidirectional device that may be used to prevent reverse flow of data from keyboard device emulator 38x to keyboard host emulator 27 and potentially to the dedicated keyboard peripheral port 31. If selected by the keyboard channel select switch 36, Keyboard device emulator 38x receives the standard or proprietary unidirectional keyboard data and translates it back to a standard bi-directional peripheral protocol such as USB, coupled through the keyboard host ports 34a to 34d to computers 6a to 6d via keyboard cables 11a to 11d respectively. Keyboard device emulators 38x may enumerate as a standard generic keyboard or may enumerate as a reflection of the specific keyboard 3 coupled to the user keyboard port 31. Enumeration as a reflection of a specific keyboard enables support of special keyboard keys and functions that are not supported by standard keyboard.

When not selected by the keyboard channel select switch 36 (channel is inactive), keyboard device emulators 38x generates required keep alive traffic to prevent coupled computers 6x from disconnect the emulated keyboard device thus preventing re-enumeration delays once that emulator is selected again by the user. Periodic keep alive packets are needed according to the USB standard to prevent the USB bus from entering an idle state when data is not passed on it.

Keyboard device emulators 38x may be a microcontroller, ASIC, FPGA or any other suitable programmable device running a pre-programmed firmware or stat-machine. Both keyboard host emulator 27 and keyboard device emulators 38x may be implemented with ROM (Read Only Memory), Fuse protected flash, One Time Programmable (OTP) or other suitable non-volatile memory technology to prevent re-programming security attacks on controllers from the user keyboard port 31 side or from the keyboard host ports 34x side.

Keyboard host emulator 27 is programmed to support only characterized keyboard devices. If the user or attacker attempts to connect a USB hub instead, the device will not be qualified and will be disabled. If the user or attacker attempts to connect a composite device having more than one peripheral functions, the Keyboard host emulator 27 will enumerate and enable only one keyboard device contained in the composite device (if exist). If no keyboard device exists in the composite device, the whole device will be disabled.

Similarly, user mouse 4 is coupled through a cable to a dedicated user mouse port 30. Dedicated user mouse port 30 is coupled to the mouse host emulator 26 through lines 141. Lines 141 may have ESD protection means, EMI filters and other electrical and safety protection means not shown here to prevent cluttering. Mouse host emulator 26 enumerate and communicate with the coupled mouse 4 using standard bi-directional peripheral protocol such as USB or PS/2. To simplify the discussion only USB will be covered hereafter.

Mouse host emulator 26 may be a microcontroller, ASIC, FPGA or any other suitable programmable device running a pre-programmed firmware or stat-machine. The firmware or state-machine is designed to enumerate and enable only mouse class peripheral devices and reject (disable) any other coupled devices. For example the following text describes an unknown USB peripheral that is being enumerated by the mouse host emulator 26:

When an unknown USB peripheral device is first connected to the mouse host emulator 26, the USB device enumeration process is started. The enumeration starts by the mouse host emulator 26 sending a reset signal to the unknown USB device. The data rate of the unknown USB device is determined during the reset signaling. After reset, the unknown USB device's information is read by the mouse host emulator 26 and the device is assigned a unique 7-bit address. If the unknown device is supported by the mouse host emulator 26 (based on pre-programmed criterions such as device class, sub-class, Vendor ID, Product ID etc), the mouse device will be activated or enabled, set to a configured state and will establish standard mouse communications with the mouse host emulator 26. If the secure KM switch 602 is restarted or a new peripheral device is reconnected, the above enumeration process is repeated.

Following enumeration and activation, the Mouse host emulator 26 sends all mouse data (horizontal movement, vertical movement, wheel, mouse keys etc) using a standard or proprietary unidirectional serial protocol through the mouse channel select switch 35. Mouse channel select switch 35 is controlled by channel select lines 29 driven by system controller function 28. Mouse channel select switch 35 connects only one channel selected by the user to the unidirectional flow forcing circuitry 39a to 39d to the mouse device emulator 37a to 37d respectively. Both Mouse host emulator 26 and mouse device emulators 37x may be programmed to map and support not only mouse movements but also mouse keys, wheel and any required controls.

Mouse device emulators 37x may enumerate as a standard generic mouse or may enumerate as a reflection of the specific mouse 3 coupled to the user mouse port 30. Enumeration as a reflection of a specific mouse enables support of special keys and functions that are not supported by standard mouse.

The unidirectional flow forcing circuitry 39x may be an optical isolator, electromagnetic isolator, logic driver, RF isolator or any other unidirectional device that may be used to prevent reverse flow of data from mouse device emulators 37x to mouse host emulator 26 and potentially to the dedicated user mouse port 30. If selected by the mouse channel select switch 35, mouse device emulators 37x receives the standard or proprietary unidirectional mouse data and translates it back to a standard bi-directional peripheral protocol such as USB, coupled to the computers 6a to 6d through mouse host ports 32a to 32d and mouse host cables 17a to 17d respectively.

When not selected by the mouse channel select switch 35, mouse device emulators 37x generates required keep alive traffic to prevent coupled computers 6x from disconnect the emulated keyboard device thus preventing re-enumeration delays once that emulator is selected again by the user.

Mouse device emulators 37x may be a microcontroller, ASIC, FPGA or any other suitable programmable device running a pre-programmed firmware. Both mouse host emulator 26 and mouse device emulators 37x may be implemented with ROM (Read Only Memory), Fuse protected flash, One Time Programmable (OTP) or other suitable non-volatile memory technology to prevent re-programming security attacks on controllers from the user mouse port 30 side or from the host mouse ports 32x side.

Mouse host emulator 26 is programmed to support only mouse (and optionally other pointing) devices. If the user or attacker attempts to connect a hub instead, the device will not be qualified and will be disabled. If the user or attacker attempts to connect a composite device having more than one peripheral functions to the user mouse port 30, the mouse host emulator 26 will enumerate and enable only one mouse device contained in the composite device (if exist). If no mouse device exists in the composite device, then the whole device will be disabled.

Selector switch or push-buttons 19 is typically connected to the System Controller function 28. System Controller function 28 manages the Secure KM Switch device 602 functionality through pre-programmed state-machine or firmware. System Controller function 28 may be implemented by microprocessor, a programmable logic device such as Programmable Logic Device (PLD) or Field-Programmable Gate Array (FPGA) or by simple discrete logic or an Application Specific Integrated Circuit (ASIC) circuitry.

Channel select line/lines 29 serves as address (selection) lines for the host channels. It may also drive the user display 13 indicating the selected channel through 7-segments or other type of numerical or graphical display. When the user selects a host channel through selector switch or push-buttons 19 or through key combinations, the system controller function 28 changes the KM channel select line/lines 29 to properly set the coupled keyboard channel select switch 36 and mouse channel select switch 35 to the user selected host. Controller function 28 may be also coupled with the keyboard host emulator 27 through line 25 to enable KM switching through predefined keyboard combinations or hot-keys. Controller function 28 detects pre-programmed key patterns to trigger certain functions such as channel switching in addition to push-buttons 19 or as stand-alone function. Controller function 28 may be programmed to further detect user mouse keys or wheel movement to detect user inputs for channel select. For example a combination of left mouse key and mouse wheel rotation may be used to toggle between displays in a cyclic sequence.

Similar to some prior-art non-secure KM switches a remote control unit 505 may be added to reduce user desktop clutter and improve security. Cable 504 connects the remote controller 505 to the secure KM switch 602 system controller function 28. Remote controller 505 having channel selection push buttons 506x and status LEDs 508x for each coupled computer. This remote controller 504 may be positioned on the user desktop while the secure KM switch 602 is remotely installed behind the desktop cabinets. Another option shown here is adding display top visual indicators such as LEDs or Electroluminescent panels 75x near each one of the user displays 2x. These display top indicators are coupled to the system controller function 28 similar to the remote controller 505 lights 508x to indicate the active computer selected by the user. In this figure computer 6a is being selected and therefore display top indicator 75a is illuminated.

It should be noted that in this figure and in all following figures switches symbols are used to clearly show function. In reality various multiplexers, discrete components, integrated circuits and various logical circuits may be used to achieve similar or same functionality.

Another optional feature of this exemplary secure KM switch is the use of the mouse cursor to enable user channel selection. Unlike prior-art KM switch illustrated in FIG. 5 above that requires Serial interconnect cables, this preferred embodiment of the current invention does not require any interconnect. This secure KM switch also does not have internal shared resources such as emulators that are susceptible to data leakages between channels.

Mouse device emulators 37x are configured in absolute mode (the cursor mode that is being used for touch-screen support).

It should be noted that standard computers and operating systems are typically operating with standard mouse using incremental cursor mode. In incremental cursor mode the location of the cursor is defined by the computer and not by the pointing device. The pointing device generates X-Y increments proportional to the user moves. There is a second mode that is being use primarily by computers having touch-screens. In this mode the pointing device controller passes to the coupled computer the exact location of the cursor on that display. This cursor mode called absolute mode as it delivers exact cursors X-Y coordinates based on the user inputs.

Using this absolute mode the cursor's absolute position rather than incremental changes are sent from the device emulators 37x to the coupled computers 6x. Host emulator 26 monitors the relative movements of the mouse and sums them up to computes the mouse pointer position. This mode enables mouse host emulator 26 to determine if the user moves the mouse cursor close to the display area border with the neighbouring display 2x. Once system controller function 28 was informed (using optional link 98) of such display area border crossing by the mouse host emulator 26, it changes the channel select line/s 29 accordingly to switch the user keyboard 3 and mouse 4 to the next channel. System controller function 28 must be pre-configured with the exact arrangement and size of displays 2x to detect display area border crossing properly. Once the channel is switched from display 2x to 2y, the absolute coordinates of mouse cursor location on the selected display 2y are computed and transferred to mouse device emulators 37y. Since the mouse in the display 2x will be still shown to the user, to prevent multiple visible cursors, the system controller function may optionally instructs the non-selected computer 6x to hide the cursor by moving it to a hidden corner at the left or right bottom of the display. Optionally, as the mouse pointer crosses screens' boundary, the optional use of absolute pointer coordinates causes the pointer to reappear at the active display near the display boundary crossing location. As mentioned above this method of cursor movement detection does not require computers 6x serial interconnect or special software applications on installation and therefore it is much more secure.

Another optional feature that may be implemented in system controller function 28 is to prevent display boarder passing while mouse key is pressed. This feature may assist system usability preventing undesired switching while dragging and object or selecting multiple objects.

Number of unidirectional flow forcing circuitries 39 and 40 may be reduced by placing only one unidirectional flow forcing circuitry 39 between mouse host emulator 26 and mouse channel select switch 35 (or one 40 between 27 and 36, and similar implementations in embodiments depicted in later drawings). However, these implementations are less secure as switches 35, 36, etc. are typically a implemented as a microcontroller (integrated inside mouse host controller function). Therefore from security standpoint dedicated unidirectional diodes are preferred (unless channel select switches are replaced with tamper immune switches such as electromechanical relays or the likes).

FIG. 8 illustrates a high-level system 700 block diagram of a preferred embodiment of the current invention similar to the embodiment illustrated in FIG. 7 above. In this preferred embodiment several functions were integrated in order to reduce embodiment complexity and cost.

In this exemplary embodiment the keyboard host emulator 44 unidirectional serial output is routed into the mouse host emulator 45 where it is combined together with the mouse unidirectional serial output into a single serial data stream routed through channel select switch 41 into one of the 4 device emulators 48a to 48d after passing through a corresponding unidirectional flow forcing circuitry 46a to 46d. These device emulators serves as a composite device having one keyboard and one mouse device and it is coupled to the 4 computers 6a to 6d through host peripheral ports 15a to 15d and host peripheral cables 97a to 97d respectively. The integration of the unidirectional link generated by the keyboard emulator 44 and mouse emulator 45 reduces to half the number of:

Channel select switches;
Unidirectional enforcing circuitries;
Device emulators;
Host peripheral ports, and
Host peripheral cables.

Further reduction in components is possible with the integration of the system controller function together with the mouse emulator function in 45.

While these changes have minor negative impact on the Secure KM switch 702 level of security, the cost and complexity reduction are significant.

FIG. 9 illustrates a high-level system 800 block diagram of an exemplary embodiment of the current invention similar to the system 700 and embodiment 702 illustrated in FIG. 8 above. This secure KM switch embodiment 802 is having an additional dedicated peripheral port 62 for special applications such as smart-card reader, biometric user authentication device, token, camera, docking station or any other allowed peripheral defined by the manufacturer or by the operator. To reduce clutter in this figure, only 2 channels secure KM 802 is shown. Therefore only 2 positions channel select switch 50 is used. Obviously this exemplary embodiment can be scaled to any required number of channels. In the following example a smart-card reader 66 is used.

For security reasons the whole dedicated peripheral port circuitry is contained in the dedicated peripheral port security function 804 and isolated from other circuitry of the secure KM switch 802.

Smart-card reader device 66 having a smart-card or Common Access Card (CAC) 68 in this example is coupled through a cable 65 into a dedicated peripheral port 62. Dedicated peripheral port 62 is typically a USB port or any other serial peripheral protocol. Dedicated peripheral port 62 is coupled to the dedicated peripheral port mode selector switch 57 through lines 51. Lines 51 may have ESD protection means, EMI filters and other electrical and safety protection means not shown here to prevent cluttering. Dedicated peripheral port mode selector switch 57 initially couples the dedicated peripheral port 62 to the qualification microcontroller function 54 that also drives the dedicated peripheral port mode selector switch 57. Qualification microcontroller function 54 enumerates the peripheral device that is coupled to the dedicated peripheral port 62 to determine if it is an allowed device based on pre-programmed qualification criteria.

This pre-programmed qualification criteria may use one or more of the following peripheral device characteristics:
1. Device class
2. Device sub-class
3. Device vendor ID
4. Device model ID Preferably or optionally, in case that the device is a smart-card reader 66, the pre-programmed qualification criteria applies only to the reader not to the card 68 as the card is qualified and authenticated by the coupled computer 6x.

To enable certain operation flexibility, the dedicated peripheral port security function 804 pre-programmed qualification criteria may be partially or fully field-programmable. Field programming can be done through a secure device learning process or data entry using various methods. In some embodiment of the present invention initial pre-programming residing on Read Only Memory (ROM) or One-Time Programmable (OTP) memory may include device classes OBh (USB smart card reader) and ODh (Finger Print Reader) as qualification criteria. More detailed criteria may be field programmer to add device sub-classes, Vendor ID and Product ID for example.

After successful qualification of the coupled smart-card reader device 66, the qualification microcontroller function 54 drives the dedicated peripheral port mode selector switch 57 to couple the user dedicated peripheral port 62 to the peripheral monitoring function 58 and the dedicated peripheral port channel select switch 55. The dedicated peripheral port channel select switch 55 controlled by the system controller function 45 through channel select line/s 29, optional freeze function 61 and lines 56. The dedicated peripheral port channel select switch 55 couples the connected device to one of the coupled hosts 6a and 6b ports through dedicated peripheral host ports 60a and 60b and cables 59a and 59b respectively. The optional freeze function 61 connected between the system controller function/mouse host emulator 45 and the dedicated peripheral port channel selection switch 55. Once the user presses the freeze function push-button 67, the last channel selected is latched and from that moment the dedicated peripheral port selected channel is freezing. The user may select another channel while the dedicated peripheral port remains on the same channel. This feature may be useful to enable the user to remain connected to a session requiring user authentication session using device 66 while interacting with other channels through the keyboard 3 and mouse 4. Freeze status indicator may be added to 67 to provide clear indication when device is in freeze mode.

The peripheral monitoring function 58 continuously monitors the dedicated peripheral port 62 traffic to detect abnormalities such as device disconnect or device reset. The peripheral monitoring function 58 is coupled on the other side to the qualification microcontroller function 54. In case that the peripheral monitoring function 58 detects an abnormal port situation or activity, it signals the qualification microcontroller function 54. The qualification microcontroller function 54 then commands the dedicated peripheral port mode selector switch 57 to switch back to the qualification microcontroller function 54 and start requalification. Optionally, alarm or alert message is issued once abnormal port situation or activity is detected.

The peripheral monitoring function 58 may be implemented using one or more of the following exemplary functions:
1. A managed USB hub wherein one downstream port is coupled to the dedicated peripheral port mode selector switch 57 and the upstream port is coupled to the dedicated peripheral port channel select switch 55. USB hub 58 may be coupled through hub status LED output or I²C management bus to the qualification microcontroller function 54 to report downstream port status and port abnormalities. USB hub may detect and report abnormalities such as: over-current fault, device disconnect, device reset, host reset etc.
2. A microcontroller having upstream and downstream peripheral ports may be used to analyze traffic passed through and detect abnormal situations similar to the USB hub above. The microcontroller 58 may be coupled to the qualification microcontroller function 54 through serial or discrete I/O.
3. An FPGA having upstream and downstream peripheral ports may be used to analyze traffic passed through and detect abnormal situations similar to the USB hub and microcontroller above. The FPGA 58 may be coupled to the qualification microcontroller function 54 through serial or discrete I/O.

Qualification microcontroller function 54 may be implemented using a microcontroller, ASIC, FPGA or any other suitable programmable device running a pre-programmed firmware. Qualification microcontroller function 54 may be also be implemented to contain additional functions such as the dedicated peripheral port mode selector switch 57 and the peripheral monitoring function 58. Coupled device disconnect can be detected using electrical or mechanical disconnection detection function that is coupled to the qualification microcontroller function 54. This function may detect USB connector disconnection by sensing ground continuity or current flow to the coupled device. This additional monitoring may be needed to augment the peripheral monitoring function 58 during time intervals that device is not enumerated by the computer (for example during computer boot).

It should be noted in the above example only the smart-card reader 66 is being enumerated, qualified and monitored by dedicated peripheral port security function 804. The smart-card 68 is not part of this process. Smart-card 68 uses smart-card reader 66 like a pipe or tunnel wherein all secure authentication traffic is passed through. Smart-card 68 authentication is performed by the computers 6x. Similarly, when reader 66 is a biometric reader such as fingerprint reader, it is generally the reader that is qualified and isolated by the dedicated peripheral port security function 804, while the verification and authorization/rejection of the biometric data is performed elsewhere as known in the art.

Optional dedicated peripheral port status light 64 is driven by the qualification microcontroller function 54 provides user indication of port status. For example a bi-color LED may be used to provide the following indications:
  Off—port is not used
  Blinking green—device qualification in progress
  Steady green—device qualified and ready for use
  Steady red—device is unqualified Optionally, additional port or ports, similar to dedicated peripheral port function may be implemented to support other dedicated peripheral functions such as touch-screen or document scanner. In this case the qualification controller may be preprogrammed at the factory or in the field to enable device customization. Security function field programming may be protected from unauthorized user modification through user name and password, smart-card, special token etc. To prevent unauthorized use of this dedicated port, the port is enabled only if the connected device is the device defined by the pre-programmed qualification characteristics.

Another feature of the current invention illustrated in this figure is the Remote Desktop Controller (RDP) port 42, coupled to the system controller/mouse host emulator 45. This port provides external power and communications to support cable-connected remote controller/indicator. For example, the cable-connected remote controller/indicator may be similar to remote controller 505 seen in FIG. 5. Some or all secure KM switch 802 control and monitoring functions may be extended to a remote location where user desktop located.

FIG. 10 illustrates a high-level system 900 block diagram of a preferred embodiment of the current invention similar to the system 700 and embodiment 702 illustrated in FIG. 8 above. This exemplary secure KM switch embodiment 902 is having an additional audio switching function and active anti-tampering system.

The optional audio switching or mixing function may be added to the Secure KM switch 902 in order to enable user to operate audio peripherals such as earphones, microphone, headset 76 or speakers. Computers 6a and 6b having additional audio cables 74a and 74b connected to the Secure KM switch 902 audio input (output, or input/output) ports 71a and 71b respectively. Cables 74x may couple audio out, audio in, microphone or other digital or analog signal. Audio switch/multiplexer/mixer 70 enables volume control of selected/unselected hosts based on programmed settings through channel select lines 29 driven by the system controller function/mouse host emulator 45. Audio switch/multiplexer/mixer 70 may be implemented by a simple relay or analog switch to enable audio channel on-off switching. Alternatively audio switch/multiplexer/mixer 70 may be implemented by a programmable mixer or attenuator to enable dynamic volume control.

For example selected computer audio channel may have higher volume compared to other host audio signals. In some exemplary embodiments, audio signals comprises of speaker signals transmitted to the user speaker, but no microphone signals. By allowing only speaker signals, unidirectional signal flow and security can be ensured. It should be noted that if microphone switching circuitry is not implemented inside the secure KM switch 902 enclosure for security reasons, external microphone switcher accessory may be added to enable user microphone control by using the embodiment RDC port 42 shown in FIG. 9 above. External microphone switcher accessory may receive channel select commands from secure KM switch system controller function or mouse host emulator 45 and coupled to the computers 6x microphone inputs and to the user microphone device 76.

In some embodiments, Secure KM switch is further comprises of active anti-tampering circuitry to detect tampering events and to permanently disable the device. Tampering sensor 82 may be a micro-switch, light sensor, shielding net sensor, x-ray sensor, temperature sensor or other physical intrusion detection capable component or a combination of several such sensors. The tampering sensor 82 is coupled to the anti-tampering controller 84 that is powered by the secure KM switch 902 power supply or by backup power source 80. Backup power source may be rechargeable battery, non-rechargeable battery, super capacitor or another energy storage component. The anti-tampering controller 84 is connected to the system controller/mouse host emulator 45, preferably in such way that it will trigger an irreversible effect on the system once triggered. Typical tampering effect is complete product disable while all front panel indicators are blinking to indicate tampering event. Additional tampering evident means such as tampering evident labels may be added to the product to indicate potential tampering. Further enhancement of system 900 security may be achieved by the additional Trusted Platform Module (TPM) 77. This industry standard or proprietary security module may interact with the anti-tampering controller 84 on one side and with one of the device emulators to provide advanced security functions such as:
Tampering logging
Tampering alarms
Attack alarms
Trust chaining of the secure KM switch with one or more of the trusted coupled hosts 6x FIG. 11 illustrates a high-level system 1000 block diagram of a preferred embodiment of the current invention identical to the preferred embodiment 702 of FIG. 8 above wherein two out of the four coupled computers are configured to support dual displays. In this system 1000 the user is working through the secure KM switch with total of 6 displays. Display 2ap is the primary display coupled to computer 6a through video out cable 8ap; Display 2 as is the secondary display coupled to computer 6a through video out cable 8 as; Display 2b is the display coupled to computer 6b through video out cable 8b; Display 2c is the display coupled to computer 6c through video out cable 8c; Display 2dp is the primary display coupled to computer 6d through video out cable 8dp; Display 2ds is the secondary display coupled to computer 6d through video out cable 8ds;

As some operating systems may not support absolute mode with dual displays, it may then be needed to load special driver application 96a on computer 6a and 96d on computer 6d to enable channel selection through cursor tracking by secure KM switch 702. The special driver application 96x sets the computer 6x to operate in absolute mode and thus to enable smooth cursor transition between displays such as the right border of display 2 as and the left border of display 2b.

FIG. 12 illustrates an exemplary front panel of a 4 channels Secure KM switch such as 602, 702, 802 and 902 of FIGS. 7 to 11 above in this specific exemplary embodiment of the present invention. It should be noted that the embodiments may have more or less channels as required for the specific application.

Front panel 80 is preferably having the following features:
Channel select push-buttons 19pa, 19pb, 19pc and 19pd enable manual user selection of coupled computers 6a to 6d respectively. Channel select push-buttons 19px may be implemented using switches, metal domes, silicon keypad, touch switches or any other suitable technology. The optional markings "1" to "4" above push-buttons 19pa, 19pb, 19pc and 19pd indicate the hosts 6a-d respectively. This convention will be used in some of the following discussion.

Channel selected indicator lights 19ia, 19ib, 19ic and 19id provides visual indication of the current selected computers 6a to 6d respectively. Channel selected indicator lights 19ix may be LED (Light Emitting Diodes) or any other user indication technology.

Dedicated peripheral port 62 is typically a USB type-A jack available to connect qualified user peripheral devices.

Dedicated peripheral port channel selected indicator lights 67a to 67d provides user indications of the current dedicated peripheral port channel selected between computers 6a to 6d respectively. Dedicated peripheral port channel selected indicator lights 67x may be LED (Light Emitting Diodes) or any other user indication technology. It should be noted that channel selected indicator lights 19ix indicates which computer 6x is currently selected, and is currently responsive to keyboard and mouse commands. This selection is controlled by selectors 19px and/or mouse and/or keyboard commands. Dedicated peripheral port channel selected indicator lights 67x indicates which computer is currently selected to interact with the authentication device such as card reader 66. This selection is influenced by pressing the freeze push-button 67.

Dedicated peripheral port status indicator light 67i provides user indication of the port status. Indication may include normal mode, failure mode (device rejected), freeze mode and off status.

Freeze push-button or switch 67 enable user selection of dedicated peripheral port freeze-unfreeze status.

RDC port connector 42 may be used to connect Remote Desktop Controller/indicator device.

Tampering evident label 81 provides permanent visual indications of mechanical tampering attempt. These labels are designed to provide clear and irreversible indications once peeled-off, moved or damaged as a result of mechanical stress on the product enclosure surface.

Channel selected 7-segments indicator 13 provides channel selected number indication to the user.

FIG. 13 illustrates an exemplary rear panel of a 4 channels Secure KM switch such as 602, 702, 802 and 902 of FIGS. 7 to 11 above in this specific exemplary embodiment of the present invention. It should be noted that embodiment may have more or less channels as required for the specific application.

The optional markings "Host 1" to "Host 4" refers the computers 6a-d respectively.

Rear panel 92 is preferably having the following features:

USB Type-A user (console) keyboard connector 31a and PS/2 mini-DIN connector 31pa to enable connection of a standard USB or PS/2 keyboard device.

USB Type-A user (console) mouse connector 30b and PS/2 mini-DIN connector 30pb to enable connection of a standard USB or PS/2 mouse device. Audio out jack 3.5 mm stereo 72 to enable connection of user headset or speakers. An additional microphone input jack may be added if needed (not shown here).

USB Type-B Host 1 to 4 peripheral port 15a to 15d to enable connection of computers 6a to 6d respectively.

USB Type-B Host 1 to 4 dedicated peripheral port 60a to 60d (or card reader port) to enable connection of computers 6a to 6d respectively.

Audio in jack 3.5 mm stereo Host 1 to 4 ports 15a to 15d to enable audio connection from computers 6a to 6d respectively.

DC jack 82 to enable connection of external wall mounted or brick type AC to DC power supply.

Tampering evident label 83 provides permanent visual indications of mechanical tampering attempt. These labels are designed to provide clear and irreversible indications once peeled-off, moved or damaged as a result of mechanical stress on the product enclosure surface.

FIG. 14 illustrates an exemplary display arrangement 90 of a 4 channels such as used in systems 500, 600, 700, 800 and 900; with Secure KM switch such as 602, 702, 802 and 902 of FIGS. 7 to 11 above according to embodiments of the present invention. This exemplary display arrangement is brought here to provide more detailed information about the cursor tracking channel select mode of the present invention.

To illustrate the cursor tracking channel select mechanism, this FIG. 14 will follow a cursor path moved by the user from start point 92 to endpoint 94 across all 4 displays 2a to 2d.

When the cursor is located in the start point 92 the Secure KM switch selected channel is 1 (computer 6a). Cursor absolute location and keyboard key-codes are routed to computer 6a. Once the user moved the cursor across display 2a right border (cross point 91a) the Secure KM switch disconnect keyboard and mouse data to computer "1" (6a) and route it to computer "3" (6c). Cursor absolute location in display 2c is calculated to the exact vertical point that the cursor was before crossing at display 2a (same height). This reappearance of the cursor in display 2b creates to the user the illusion that the desktop space is continuous.

Once the user further moved the cursor across display 2c top border (cross point 91b) the Secure KM switch disconnect keyboard and mouse data to computer 6c and route it to computer "2" (6b). Cursor absolute location in display 2b is calculated to the exact lateral point that the cursor was before crossing at display 2c.

Similarly once the user further moved the cursor across display 2c lower border (cross point 91c) the Secure KM switch disconnect keyboard and mouse data to computer 6b and route it to computer 6c. Cursor absolute location in display 2c is calculated to the exact lateral point that the cursor was before crossing at display 2b. Similar process takes place at crossing points 91d and 91e until the cursor stops in display 2c while Secure KM switch route keyboard and mouse data to computer 6c.

It should be noted that when computers 6x are not selected by the Secure KM switch, still their coupled device emulators optionally performing one or both of:

1. Generating required periodic keep alive traffic to prevent a situation that the port/device will be disabled by the coupled computer 6x.
2. Hiding the non-active cursor for example by sending an absolute position to locate the cursor at one of the extreme display corners.

In the depicted exemplary embodiment, since display 4 (2d) is larger size, display border crossing lines must be calculated to provide a smooth and continuous line at crossing points 91d and 91e. At crossing point 91d mouse cursor speed should be reduced to compensate for the larger display 4 (2d), and vice versa in crossing point 91e.

As pointer motion is fully controlled by the secure KM switch and not by coupled computers, user pointer speed and acceleration may be adjusted by the user through programming means to provide maximum comfort.

The secure KM switch of the present invention may use entered display settings to further enhance user experience by regulating the cursor moving speed across the different displays. As displays may be larger or smaller, cursor movement should be adjusted to prevent speed and acceleration changes.

FIG. 15 illustrates an exemplary method to be used to enable 4-ports secure KM switch displays setting programming according to an embodiment of the current invention assuming all displays are similar size and resolution for simplicity.

In this example, the displays matrix 93 comprises up to 8 lines or just 3 lines in this particular example (designated A to C) and up to 8 rows (designated 1 to 8) of user displays 2x. To enable Secure KM switch customization to specific installation display setup, the operator may enter an initialization string containing the exact location/designation of each attached display. The exemplary string 87 is aligned to the left in this example. In this example computer 1 (6a) is dual displays having a primary display located at matrix cell 1A and a secondary display located at matrix cell 2A. The resulted initialization string of this example is marked in string 87 as "1P=1A;1S=2A;". Similarly, computer 2 (6*b*) has a single display located at matrix cell 2B as indicated by "2-2B;" in string 87.

Initialization string entry may be performed by the product operator though one or more of means such as:

1. Keyboard entry using special keys sequence to enter programming mode and then additional keys typing to enter required setting codes.
2. Mass storage device having initialization file coupled to the secure KM switch for example instead of the user keyboard or mouse. USB flash drive may be used to deliver programmed settings to multiple secure KM devices.
3. Bar-code reader, for example connected instead of the user keyboard to emulate standard keyboard using printed bar-code patterns in the user's manual.
4. Front panel or remote desktop controller switches or graphic user interface.
5. Dedicated programming tool or cable
6. Connection to a PC having initialization program or file through a dedicated or standard cable.
7. Smart-card having initialization file entered into a standard reader that is coupled into the user mouse or keyboard ports or into the RDC port.

Computer application may be provided with the secure KM switch to enable display configuration setting together with other system or user customization parameters. Once application saves required user programmed settings it may be coupled to the secure KM switch through a cable to transfer entered configuration. Last configuration entered by the user is then stored in a non-volatile memory integrated or coupled to the said system controller function.

FIG. 16 illustrates an exemplary method to be used to enable 4-ports secure KM switch displays and user settings programming according to an embodiment of the current invention assuming displays of various sizes.

In this example, the displays matrix 95 comprises of a grid having 22 vertical lines marked from 1 to 22 and 22 horizontal lines marked from A to V. Larger o smaller matrix may be used to enable proper display arrangements as needed. To enable Secure KM switch customization to specific installation display setup, the operator may enter numerically or graphically an initialization string containing the exact location/designation of each attached display left bottom and right top corners. The exemplary string 97 is aligned to the matrix origin in this example. In this example computer 1 (6*a*) is configured to drive a single display located at: Left bottom corner at 1A; Right top corner at 9G. All other 3 displays location described in a similar way. The resulted initialization string of this example is 1=1A-9G; 2=9A-19J;3=9J-22U;4=1G-9N. Additional user settings such as cursor speed (=5) and cursor acceleration (=8) may be added to enable further customization. String 97 may be programmed directly into the secure KM switch device or prepared on local or web application and then loaded into the secure KM switch device/s.

The invention claimed is:

1. A Secure KM switch apparatus comprising:
    a user keyboard port capable of interfacing with a user keyboard;
    a keyboard host emulator to emulate computer host coupled to user keyboard port on one side and to keyboard channel select switch on the other side;
    at least one unidirectional flow forcing hardware device to assure that data is only flowing from keyboard channel select switch to coupled keyboard device emulators and no other data may flow from the keyboard device emulators back to the keyboard channel select switch and to the coupled keyboard host emulator;
    a keyboard channel select switch controlled by System Controller function to connect only one selected channel keyboard device emulator to the said unidirectional flow forcing hardware device at a time;
    a plurality of host keyboard ports for coupling isolated coupled computers through cables;
    a plurality of keyboard device emulators, to emulate a standard keyboard or replicated identity of user keyboard for each one of the coupled isolated computer channels through host keyboard ports;
    a user mouse port to connect a standard user mouse or pointing device;
    a mouse host emulator to emulate computer host coupled to user mouse port on one side and to mouse channel select switch on the other side;
    at least one unidirectional flow forcing hardware device to assure that data is only flowing from said mouse channel select switch to coupled mouse device emulators and no other data may flow from the mouse device emulators back to the mouse channel select switch and to the coupled mouse host emulator;
    a mouse channel select switch controlled by System Controller function to connect only one selected channel mouse device emulator at a time to the said unidirectional flow forcing hardware device;
    a plurality of mouse device emulators to emulate standard mouse device for each one of the coupled computer channels through host mouse ports;
    a plurality of host mouse ports for coupling isolated coupled computers through cables; and
    a System Controller function to control said keyboard channel select switch and mouse channel select switch based on user inputs,
    wherein the apparatus is configured to operate in a cursor tracking mode wherein channel select is extracted from mouse cursor position and path analysis compared to pre-programmed displays arrangement to provide the user with the visual illusion of a single continuous desktop workspace across different isolated displays, wherein each of said displays is coupled to the corresponding one of said isolated coupled computers.

2. The Secure KM switch apparatus of claim 1, wherein channel selection user input is provided by selectors such as: at least one switch located at the apparatus front panel, at least one switch located in a remote controller, mouse keys or wheel, and pre-programmed keyboard key combinations.

3. The Secure KM switch apparatus of claim 1, wherein said cursor tracking mode comprises a function to hide inactive cursor pointer by method selectable from the list consisting of:
    moving inactive cursor to one of the display extreme corners, and
    signaling the coupled computer mouse driver to hide the cursor.

4. The Secure KM switch apparatus of claim 1, wherein said cursor tracking mode comprises a function enable constant speed and acceleration of the user cursor based on user preprogrammed displays size, speed preference, and acceleration preference.

5. The Secure KM switch apparatus of claim 1, wherein said mouse device emulators and keyboard device emulators are sending keep-alive packets to coupled computers when not selected by the user to prevent peripheral device disconnection and re-enumeration.

6. The Secure KM switch apparatus of claim 1, further having user audio switching functions selected from a group consisting of audio output switching, audio output mixer, microphone input switching, and remote microphone input switching.

7. The Secure KM switch apparatus of claim 1, further having Anti-tampering selected from a group of anti-tampering consisting of active anti-tampering with at least one tampering sensors, tamper evident paint, tamper evident labels, Trusted Platform Module to enable tampering event logging and platform authentication.

8. The Secure KM switch apparatus of claim 1, further having Remote Desktop Controller (RDC) Port to support external devices selectable from the list comprising: remote desktop controller, remote display top indicator, external microphone input switcher, and remote management or programmer computer.

9. The Secure KM switch apparatus of claim 1, further having a software driver component to be installed in at least one coupled computer to support dual display operation in cursor tracking operating mode and to enable inactive cursor hiding.

10. The Secure KM switch apparatus of claim 1, wherein:
keyboard host emulator, mouse host emulator and system controller function are integrated into a single microcontroller,
keyboard and mouse unidirectional flow enforcing hardware devices are integrated into one circuit,
keyboard and mouse channel select switches are integrated into one channel select switch, and
keyboard and mouse device emulators are integrated into one set of device emulators per host port configured as composite devices.

11. The Secure KM switch apparatus of claim 1, wherein said unidirectional flow forcing hardware device is selected from the group consisting of: optical isolator, electromagnetic isolator, logic driver, and RF isolator.

12. A Secure KM switch apparatus comprising:
a user keyboard port capable of interfacing with a user keyboard;
a keyboard host emulator to emulate computer host coupled to user keyboard port on one side and to keyboard channel select switch on the other side;
at least one unidirectional flow forcing ¬ hardware device to assure that data is only flowing from keyboard channel select switch to coupled keyboard device emulators and no other data may flow from the keyboard device emulators back to the keyboard channel select switch and to the coupled keyboard host emulator;
a keyboard channel select switch controlled by System Controller function to connect only one selected channel keyboard device emulator to the said unidirectional flow forcing ¬ hardware device at a time;
a plurality of keyboard device emulators to emulate a standard keyboard or replicated identity of user keyboard for each one of the coupled isolated computer channels through host keyboard ports;
a plurality of host keyboard ports for coupling coupled isolated computers through cables;
a user mouse port to connect a standard user mouse or pointing device;
a mouse host emulator to emulate computer host coupled to user mouse port on one side and to mouse channel select switch on the other side;
at least one unidirectional flow forcing hardware device to assure that data is only flowing from said mouse channel select switch to coupled mouse device emulators and no other data may flow from the mouse device emulators back to the mouse channel select switch and to the coupled mouse host emulator;
a mouse channel select switch controlled by System Controller function to connect only one selected channel mouse device emulator at a time to the said unidirectional flow forcing ¬ hardware device;
a plurality of mouse device emulators to emulate standard mouse device for each one of the coupled computer channels through host mouse ports;
a plurality of host mouse ports for coupling coupled isolated computers through cables; and
a System Controller function to control said keyboard channel select switch and mouse channel select switch based on user inputs, further having at least one dedicated peripheral port security function comprising:
a dedicated peripheral port to connect a qualified user peripheral device;
a dedicated peripheral port mode switch to couple the said dedicated peripheral port to a qualification microcontroller while in qualification mode or to channel select switch and port monitor function while in normal mode; and
a qualification microcontroller function to emulate computer host to allow coupled peripheral device enumeration and qualification and upon successful qualification commanding said user authentication device peripheral switch to couple the dedicated peripheral port to the said computer peripheral port.

13. The Secure KM switch of claim 12, wherein said dedicated peripheral port security function further comprises an additional port monitoring hardware device, said monitoring hardware device is coupled to the qualification microcontroller to enable detection of coupled peripheral device disconnect and to command the coupled dedicated peripheral port mode switch to switch back to the qualification microcontroller function.

14. The Secure KM switch of claim 13, wherein said additional monitoring hardware device consists of at least one of a group comprising a monitor-able USB hub, mechanical connector detector, device ground detector, and device current detector.

15. The Secure KM Switch apparatus of claim 12, wherein in the at least one dedicated peripheral port security function, the qualification controller, the host emulators, and the device emulators are field programmable to enable field customization to specific peripherals.

16. The Secure KM Switch apparatus of claim 12, wherein System Controller function display arrangement and other customizable device settings are field upgradeable through means selectable from a list comprising keyboard entries, external programmer, bar-code reader, coupled mass-storage device, c, coupled computer, front-panel GUI, remote desktop controller or user calibration process.

17. A secure multi-computer system using a KM switch comprising a secure KM switch apparatus, the secure multi-computer system comprising:
a KM switch comprising:
a user keyboard port capable of interfacing with a user keyboard;
a keyboard host emulator to emulate computer host coupled to user keyboard port on one side and to keyboard channel select switch on the other side;
at least one unidirectional flow forcing hardware device to assure that data is only flowing from keyboard channel select switch to coupled keyboard device emulators and no other data may flow from the keyboard device emulators back to the keyboard channel select switch and to the coupled keyboard host emulator;

a keyboard channel select switch controlled by System Controller function to connect only one selected channel keyboard device emulator to the said unidirectional flow forcing hardware device at a time;

a plurality of keyboard device emulators to emulate a standard keyboard or replicated identity of user keyboard for each one of the coupled computer channels through host keyboard ports;

a plurality of host keyboard ports for coupling coupled computers through cables;

a user mouse port to connect a standard user mouse or pointing device;

a mouse host emulator to emulate computer host coupled to user mouse port on one side and to mouse channel select switch on the other side;

at least one unidirectional flow forcing hardware device to assure that data is only flowing from said mouse channel select switch to coupled mouse device emulators and no other data may flow from the mouse device emulators back to the mouse channel select switch and to the coupled mouse host emulator;

a mouse channel select switch controlled by System Controller function to connect only one selected channel mouse device emulator at a time to the said unidirectional flow forcing hardware device;

a plurality of mouse device emulators to emulate standard mouse device for each one of the coupled computer channels through host mouse ports;

a plurality of host mouse ports for coupling coupled computers through cables; and a System Controller function to control said keyboard channel select switch and mouse channel select switch based on user inputs; and at least a first and a second mutually isolated computer systems, each one of said mutually isolated computer systems comprising:

a computer having:

a computer keyboard port coupled through said cables to said respective host keyboard port; and a computer mouse port coupled through said cables to said respective host mouse port; and a display coupled to said computer, wherein only one of said first and second computer systems is controlled by said user keyboard and user mouse at the time, and wherein no information may be exchanged between said first and second mutually isolated computer systems through said secure KM switch apparatus, wherein said KM switch is configured to operate in cursor tracking mode wherein channel select is extracted from mouse cursor position and path analysis compared to pre-programmed displays arrangement to provide the user with the visual illusion of a single continuous desktop workspace across different isolated displays, each of said display is coupled to the corresponding one of said isolated computers.

18. The secured multi-computer system using a KM switch of claim 17, wherein said first and second computer systems are connected to a first and second different networks, and wherein no information may be exchanged between said first and second networks through said secure KM switch apparatus.

19. A method of securely coupling a plurality of computer systems to a single keyboard and a single mouse comprising:

connecting a single user mouse to a host emulator capable of extracting mouse commands from said user mouse;

selecting one of a plurality of isolated computer systems to receive said extracted mouse commands;

passing said extracted mouse commands to said selected isolated computer system through a unidirectional flow forcing hardware device and a device emulator; and operating in cursor tracking mode, wherein channel select is extracted from mouse cursor position and path analysis compared to pre-programmed displays arrangement to provide the user with the visual illusion of a single continuous desktop work space across different isolated displays, each of said display is coupled to the corresponding one of said isolated computers, wherein:

said passing said extracted keyboard commands to said selected isolated computer system is through a keyboard device emulator; and said passing said extracted mouse commands to said selected isolated computer system is through a mouse device emulator.

20. The method of claim 19, further comprising:

connecting a single user keyboard a host emulator capable of extracting mouse commands from said user keyboard; and passing said extracted keyboard commands to said selected isolated computer system through a unidirectional flow forcing hardware device and a device emulator.

* * * * *